(12) United States Patent
Fukushima

(10) Patent No.: US 10,310,690 B2
(45) Date of Patent: Jun. 4, 2019

(54) ARRAY SUBSTRATE, DISPLAY APPARATUS, AND METHOD OF INSPECTING SENSOR ELECTRODE

(71) Applicant: Japan Display Inc., Tokyo (JP)

(72) Inventor: Toshiaki Fukushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 112 days.

(21) Appl. No.: 15/609,880

(22) Filed: May 31, 2017

(65) Prior Publication Data
US 2017/0371447 A1 Dec. 28, 2017

(30) Foreign Application Priority Data
Jun. 23, 2016 (JP) .................. 2016-124947

(51) Int. Cl.
G06F 3/041 (2006.01)
G06F 3/044 (2006.01)
G02F 1/1333 (2006.01)
G02F 1/1345 (2006.01)
G02F 1/1362 (2006.01)
G02F 1/1368 (2006.01)

(52) U.S. Cl.
CPC .......... G06F 3/044 (2013.01); G02F 1/1368 (2013.01); G02F 1/13338 (2013.01); G02F 1/13458 (2013.01); G02F 1/136286 (2013.01); G06F 3/0412 (2013.01); G06F 3/0416 (2013.01); G02F 2201/121 (2013.01); G02F 2201/123 (2013.01); G06F 2203/04105 (2013.01)

(58) Field of Classification Search
CPC .......... G02F 1/13458; G02F 1/136286; G02F 1/1368; G02F 1/133351; G02F 1/13338; G02F 2201/121; G02F 2201/123; G06F 3/0412; G06F 3/0414; G06F 3/0416; G06F 3/0418; G06F 3/044; G06F 2203/04103; G06F 2203/04105
See application file for complete search history.

(56) References Cited

U.S. PATENT DOCUMENTS

| 9,092,105 | B2 * | 7/2015 | Furutani | ................. G06F 3/044 |
| 2011/0140720 | A1 | 6/2011 | Kurashima | |
| 2013/0082964 | A1 * | 4/2013 | Agari | ...................... G06F 3/044 |
| | | | | 345/173 |
| 2014/0192019 | A1 * | 7/2014 | Fukushima | ........... G06F 3/0412 |
| | | | | 345/174 |

FOREIGN PATENT DOCUMENTS

JP 2011-128673 A 6/2011

* cited by examiner

*Primary Examiner* — Nelson M Rosario
(74) *Attorney, Agent, or Firm* — K&L Gates LLP

(57) ABSTRACT

According to an aspect, an array substrate includes: a substrate; a sensor electrode disposed on the substrate, and configured to detect change of capacitance; and a pull-out line capable of being electrically coupled with the sensor electrode, and pulled out to an end portion of the substrate.

16 Claims, 22 Drawing Sheets

ARRAY SUBSTRATE, DISPLAY APPARATUS, AND METHOD OF INSPECTING SENSOR ELECTRODE

CROSS-REFERENCE TO RELATED APPLICATIONS

This application claims priority from Japanese Application No. 2016-124947, filed on Jun. 23, 2016, the contents of which are incorporated by reference herein in its entirety.

BACKGROUND

1. Technical Field

The present invention relates to an array substrate, a display apparatus, and a method of inspecting a sensor electrode.

2. Description of the Related Art

In recent years, touch detection devices capable of detecting an external proximity object, or so-called touch panels, have received attention. The touch panel is mounted on or integrated with a display apparatus such as a liquid crystal display apparatus, and is used as a display apparatus with a touch detection function. A display apparatus including a capacitance touch sensor is known as the display apparatus with a touch detection function.

In the touch panel apparatus, an inspection electrode for detecting disconnection of an input position detection electrode of the touch panel apparatus needs to be mounted on a substrate, and the substrate becomes larger according to the number of the inspection electrodes.

For the foregoing reasons, there is a need for a small array substrate, a small display apparatus, and a method of inspecting a sensor electrode.

SUMMARY

According to an aspect, an array substrate includes: a substrate; a sensor electrode disposed on the substrate, and configured to detect change of capacitance; and a pull-out line capable of being electrically coupled with the sensor electrode, and pulled out to an end portion of the substrate.

According to another aspect, a display apparatus is provided, in which an array substrate and a counter substrate are bonded together. The array substrate includes: a substrate; a sensor electrode disposed on the substrate, and configured to detect change of capacitance; and a pull-out line capable of being electrically coupled with the sensor electrode, and pulled out to an end portion of the substrate.

According to another aspect, a method of inspecting a sensor electrode included in a mother substrate from which a first substrate is cut, the mother substrate including: a first substrate region to become the first substrate; a sensor electrode arranged in the first substrate region and configured to detect change of capacitance; an end material region adjacent to the first substrate region; a pad for sensor electrode inspection disposed in the end material region; and a pull-out line arranged across a boundary of the first substrate region and the end material region, and configured to couple the sensor electrode and the pad for sensor electrode inspection with each other, the method includes: confirming conduction from the pad for sensor electrode inspection to the sensor electrode before cutting the first substrate from the mother substrate such that the first substrate region and the end material region are separated from each other.

DETAILED DESCRIPTION

Figure 1:
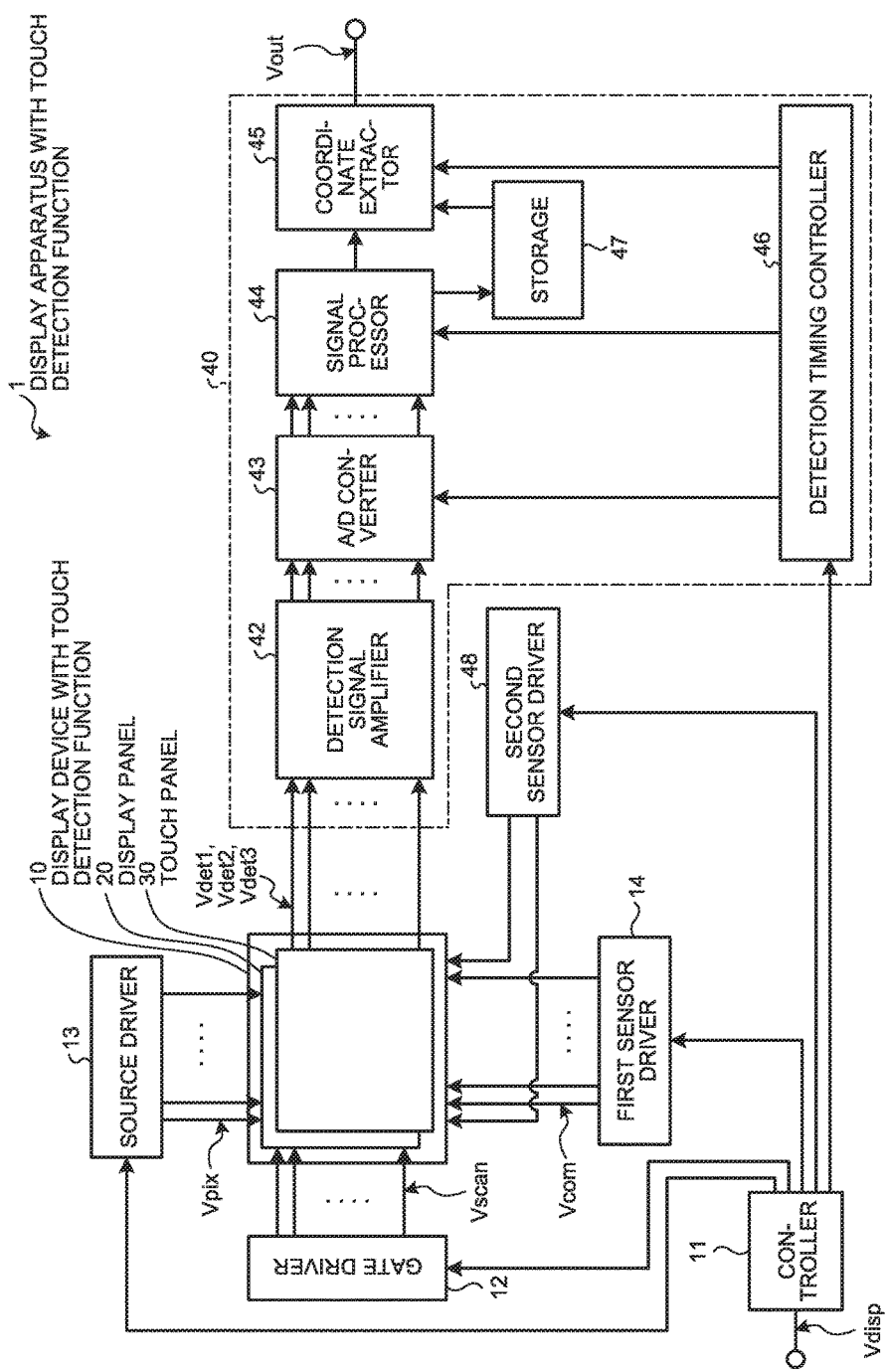
FIG. 1 is a block diagram illustrating a configuration example of a display apparatus with a touch detection function according to a first embodiment.

Modes (embodiments) for carrying out the present invention will be described in detail with reference to the drawings. The present invention is not limited by the descriptions of the following embodiments. The elements described hereunder include those that can be easily thought of by those skilled in the art and substantially the same elements. The elements described hereunder may also be combined as appropriate. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases. In this disclosure, when an element is described as being "on" another element, the element can be directly on the other element, or there can be one or more elements between the element and the other element.

First Embodiment

FIG. 1 is a block diagram illustrating a configuration example of a display apparatus with a touch detection function according to a first embodiment. As illustrated in FIG. 1, a display apparatus 1 with a touch detection function includes a display device 10 with a touch detection function, a controller 11, a gate driver 12, a source driver 13, a first sensor driver 14, and a detector 40. The display apparatus 1 with a touch detection function is a display apparatus in which the display device 10 with a touch detection function has a touch detection function built therein. The display device 10 with a touch detection function is a device in which a display panel 20 using a liquid crystal display as a display element and a touch panel 30 as an input detection device that detects a touch input are integrated. The display device 10 with a touch detection function may be a so-called on-cell type device in which the touch panel 30 is mounted on the display panel 20. The display panel 20 may be an organic EL display panel, for example.

The display panel 20 is an element that performs display by sequentially scanning each one horizontal line in accordance with a scanning signal Vscan supplied from the gate driver 12, which will be described below. The controller 11 is a circuit that supplies control signals to the gate driver 12, the source driver 13, the first sensor driver 14, and the detector 40, in accordance with a video signal Vdisp supplied from the outside, and controls them to operate in synchronization with one another.

The gate driver 12 has a function to sequentially select one horizontal line that serves as a target of display drive for the display device 10 with a touch detection function, in accordance with the control signal supplied from the controller 11.

The source driver 13 is a circuit that supplies a pixel signal Vpix to each sub-pixel SPix, which will be described below, of the display device 10 with a touch detection function, in accordance with the control signal supplied from the controller 11.

The first sensor driver 14 is a circuit that supplies a first drive signal Vcom to a first sensor electrode COML, which will be described below, of the display device 10 with a touch detection function, in accordance with the control signal supplied from the controller 11.

The touch panel 30 detects contact or proximity of an external conductor with or to a display region by operating on the basis of the basic principle of capacitive touch detection, and performing a touch detection operation by a mutual capacitance method. The touch panel 30 may perform a touch detection operation by a self-capacitance method. The touch panel 30 performs a force detection operation by the self-capacitance method.

The detector 40 is a circuit that detects whether there is a touch on the touch panel 30, in accordance with the control signal supplied from the controller 11 and a first detection signal Vdet1 supplied from the touch panel 30. When there is a touch, the detector 40 obtains the coordinates and the like of the touch input. The detector 40 includes a detection signal amplifier 42, an A/D converter 43, a signal processor 44, a coordinate extractor 45, and a storage 47. A detection timing controller 46 controls the A/D converter 43, the signal processor 44, and the coordinate extractor 45 to operate in synchronization with one another, in accordance with the control signal supplied from the controller 11.

Further, a second sensor driver 48 is a selection circuit for gate lines 23, which will be described below, for supplying a DC voltage signal Vdc or a guard signal Vsg1 to a part of the gate lines 23, when detecting force applied to the display device 10 with a touch detection function. The detector 40 detects the force applied to the display device 10 with a touch detection function, in accordance with a second detection signal Vdet2 and a third detection signal Vdet3 supplied from the touch panel 30.

Figure 2:
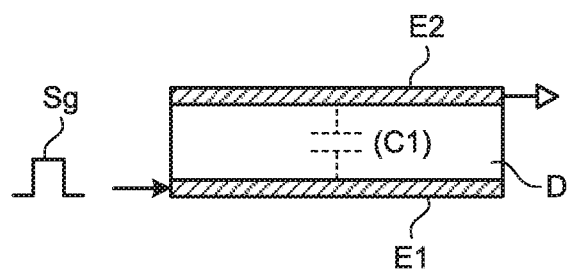
FIG. 2 is an explanatory diagram illustrating a state in which a finger is neither in contact with nor in proximity to the display apparatus, for describing the basic principle of mutual capacitive touch detection.
Figure 3:
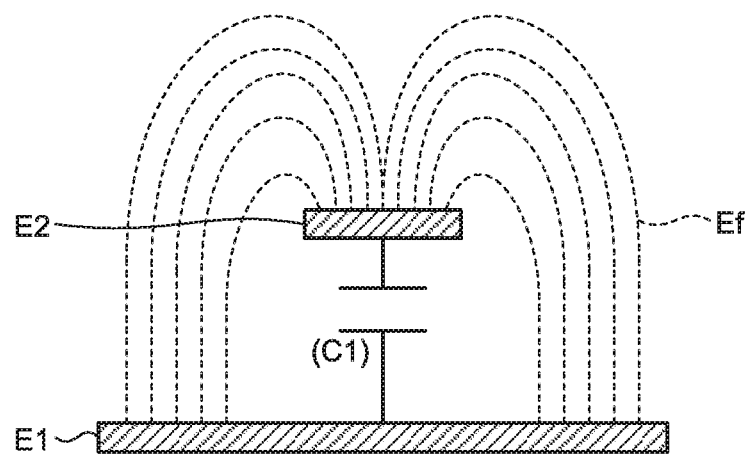
FIG. 3 is an explanatory diagram illustrating an example of a fringe field in the state in which a finger is neither in contact with nor in proximity to the display apparatus illustrated in FIG. 2.
Figure 4:
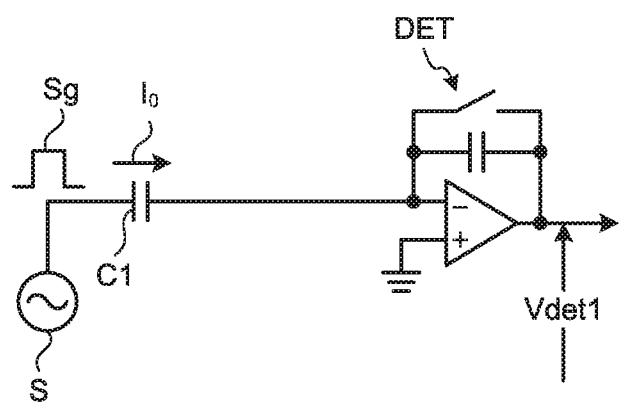
FIG. 4 is an explanatory diagram illustrating an example of an equivalent circuit in the state in which a finger is neither in contact with nor in proximity to the display apparatus illustrated in FIG. 2.
Figure 5:
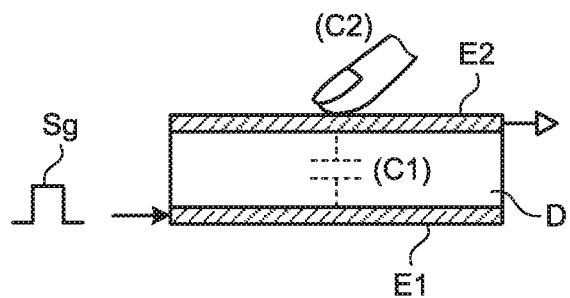
FIG. 5 is an explanatory view illustrating a state in which a finger is in contact with or is in proximity to the display apparatus, for describing the basic principle of the mutual capacitive touch detection.
Figure 6:
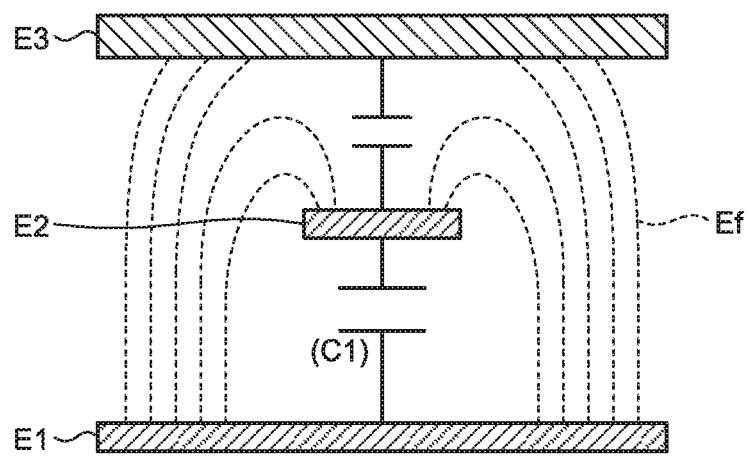
FIG. 6 is an explanatory diagram illustrating an example of a fringe field in the state in which a finger is in contact with or is in proximity to the display apparatus illustrated in FIG. 5.
Figure 7:
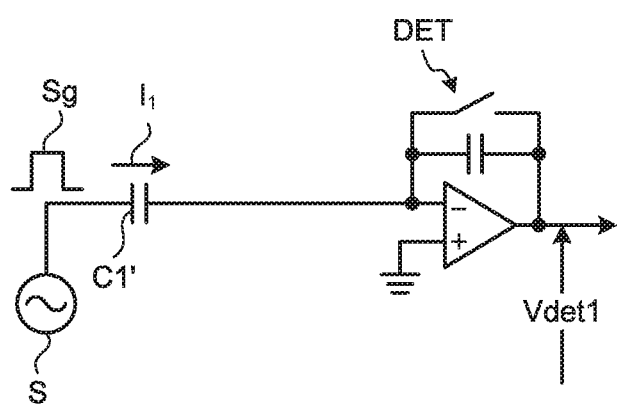
FIG. 7 is an explanatory diagram illustrating an example of an equivalent circuit in the state in which a finger is in contact with or is in proximity to the display apparatus illustrated in FIG. 5.
Figure 8:
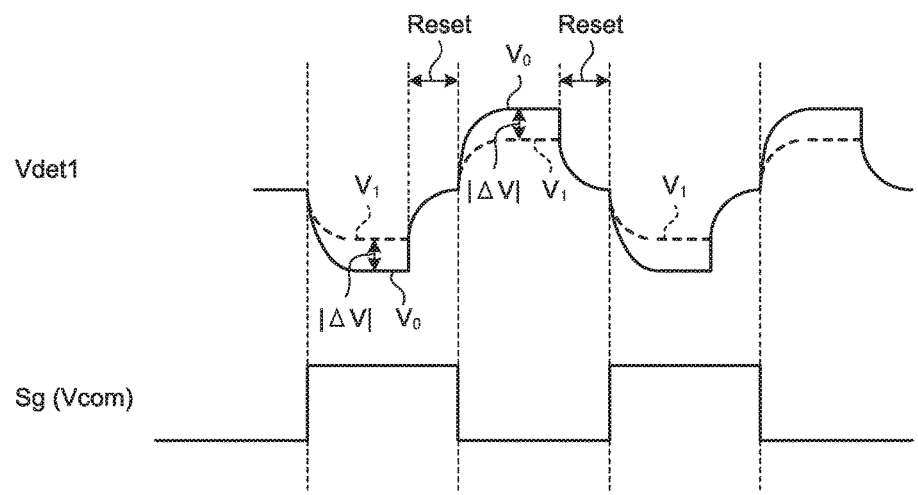
FIG. 8 is a diagram illustrating an example of waveforms of a drive signal and a first detection signal of the mutual capacitive touch detection.

As described above, the touch panel 30 operates on the basis of the basic principle of capacitive touch detection. The following describes the basic principle of touch detection by the display apparatus 1 with a touch detection function according to the present embodiment using the mutual capacitance method, with reference to FIGS. 2 to 8. FIG. 2 is an explanatory diagram illustrating a state in which a finger is neither in contact with nor in proximity to the display apparatus, for describing the basic principle of the mutual capacitive touch detection. FIG. 3 is an explanatory diagram illustrating an example of a fringe field of the state in which a finger is neither in contact with nor in proximity to the display apparatus illustrated in FIG. 2. FIG. 4 is an explanatory diagram illustrating an example of an equivalent circuit of the state in which a finger is neither in contact with nor in proximity to the display apparatus illustrated in FIG. 2. FIG. 5 is an explanatory diagram illustrating a state in which a finger is in contact with or is in proximity to the display apparatus, for describing the basic principle of the mutual capacitive touch detection. FIG. 6 is an explanatory diagram illustrating an example of a fringe field of the state in which a finger is in contact with or is in proximity to the display apparatus illustrated in FIG. 5. FIG. 7 is an explanatory diagram illustrating an example of an equivalent circuit of the state in which a finger is in contact with or is in proximity to the display apparatus illustrated in FIG. 5. FIG. 8 is a diagram illustrating an example of waveforms of the drive signal and the first detection signal. The following describes an example of a finger in contact with or in proximity to the display apparatus. However, the present disclosure is not limited to the finger, and may be an object including a conductor, such as a stylus pen.

For example, as illustrated in FIG. 2, a capacitive element C1 includes a pair of electrodes, i.e., a drive electrode E1 and a detection electrode E2, arranged to face each other with a dielectric D interposed therebetween. The drive electrode E1 corresponds to the first sensor electrode COML described blow and the detection electrode E2 corresponds to a second sensor electrode TDL described below. In the capacitive element C1, electric lines of force Ef for a fringe extending from an end portion of the drive electrode E1 to an upper surface of the detection electrode E2 are formed as illustrated in FIG. 3, in addition to electric lines of force (not illustrated) formed between counter surfaces of the drive electrode E1 and the detection electrode E2. As illustrated in FIG. 4, one end of the capacitive element C1 is coupled with an AC signal source (drive signal source) S and the other end thereof is coupled with a voltage detector DET. The voltage detector DET is an integrator included in the detection signal amplifier 42 illustrated in FIG. 1, for example.

When an AC rectangular wave Sg of a predetermined frequency (e.g., about several kHz to several hundreds of kHz) is applied from the AC signal source S to the drive electrode E1 (one end of the capacitive element C1), an output waveform (the first detection signal Vdet1) as illustrated in FIG. 8 appears through the voltage detector DET coupled with the detection electrode E2 side (the other end of the capacitive element C1). The AC rectangular wave Sg corresponds to the first drive signal Vcom input from the first sensor driver 14.

In the state in which a finger is neither in contact with nor in proximity to the display apparatus (non-contact state), a current $I_0$ according to a capacitance value of the capacitive element C1 flows with charge or discharge to or from the capacitive element C1, as illustrated in FIG. 4. The voltage detector DET illustrated in FIG. 4 converts variation of the current $I_0$ according to the AC rectangular wave Sg into variation of a voltage (a waveform $V_0$ in the solid line illustrated in FIG. 8).

On the other hand, in the state in which a finger is in contact with or is in proximity to the display apparatus (contact state), capacitance C2 formed by the finger is in contact with or is in proximity to the detection electrode E2, as illustrated in FIG. 5. Accordingly, a conductor E3 (the finger) blocks the electric lines of force Ef for a fringe between the drive electrode E1 and the detection electrode E2, as illustrated in FIG. 6. The capacitive element C1 thus acts as a capacitive element C1' with a smaller capacitance value than the capacitance value in the non-contact state, as illustrated in FIG. 7. In the equivalent circuit illustrated in FIG. 7, a current $I_1$ flows through the capacitive element C1. As illustrated in FIG. 8, the voltage detector DET converts variation of the current $I_1$ according to the AC rectangular wave Sg into variation of a voltage (a waveform $V_1$ indicated by the dotted line). In this case, the waveform $V_1$ has a smaller amplitude than that of the waveform $V_0$. As a result, an absolute value $|\Delta V|$ of the voltage difference between the waveform $V_0$ and the waveform $V_1$ varies depending on the influence of the conductor E3 such as the finger that comes into contact with or in proximity to the display apparatus from the outside. To accurately detect the absolute value $|\Delta V|$ of the voltage difference between the waveform $V_0$ and the waveform $V_1$, the voltage detector DET preferably performs the operation with a period Reset to reset charge and discharge of a capacitor on the basis of the frequency of the AC rectangular wave Sg by switching in the circuit.

The touch panel 30 illustrated in FIG. 1 performs touch detection by the mutual capacitance method by sequentially scanning each supply unit of the first sensor electrode(s) COML in accordance with the first drive signal Vcom supplied from the first sensor driver 14. A supply unit of the first sensor electrode(s) COML may be one first sensor electrode COML or may be a set of first sensor electrodes COML to which the first drive signal Vcom is supplied at the same time.

The touch panel 30 outputs the first detection signal Vdet1 for each supply unit of the first sensor electrode(s) COML from a plurality of second sensor electrodes TDL described below through the voltage detector DET illustrated in FIG. 4 or 7. The first detection signal Vdet1 is supplied to the detection signal amplifier 42 of the detector 40.

The detection signal amplifier 42 amplifies the first detection signal Vdet1 supplied from the touch panel 30. The detection signal amplifier 42 may include an analog low pass filter (LPF) that removes a high frequency component (noise component) included in the first detection signal Vdet1 and then outputs the signal.

The A/D converter 43 samples an analog signal output from the detection signal amplifier 42 and converts the analog signal into a digital signal at timing in synchronization with the first drive signal Vcom.

The signal processor 44 includes a digital filter that reduces frequency components (noise components) other than a frequency at which the first drive signal Vcom is sampled, included in the output signal of the A/D converter 43. The signal processor 44 is a logic circuit that detects whether a touch is made on the touch panel 30, in accordance with the output signal of the A/D converter 43. The signal processor 44 performs processing of extracting only a difference of the detection signals caused by the finger. The signal of the difference caused by the finger is the absolute value $|\Delta V|$ of the difference between the waveform $V_0$ and the waveform $V_1$. The signal processor 44 may perform an arithmetic operation for averaging the absolute values $|\Delta V|$ per supply unit of the first sensor electrode(s) COML, thereby calculating the average value of the absolute values $|\Delta V|$. The signal processor 44 thus can reduce the influence of noise. The signal processor 44 compares the signal of the difference caused by the detected finger with a predetermined threshold voltage. When the difference is less than the threshold voltage, the signal processor 44 determines that the external proximity object is in the non-contact state. On the other hand, when the difference is equal to or larger than the threshold voltage, the signal processor 44 determines that the external proximity object is in the contact state. In this way, the detector 40 can perform the touch detection.

The coordinate extractor 45 is a logic circuit that obtains touch panel coordinates when the touch is detected by the signal processor 44. The coordinate extractor 45 outputs the touch panel coordinates as a detection signal output Vout. As described above, the display apparatus 1 with a touch detection function of the present embodiment can detect the touch panel coordinates of the position at which the conductor such as the finger is in contact therewith or is in proximity thereto, on the basis of the basic principle of the touch detection by the mutual capacitance method.

Figure 9:
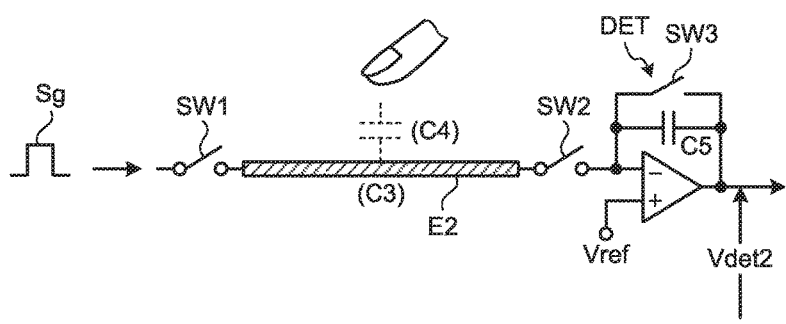
FIG. 9 is an explanatory diagram illustrating an example of an equivalent circuit of self-capacitive touch detection.
Figure 10:
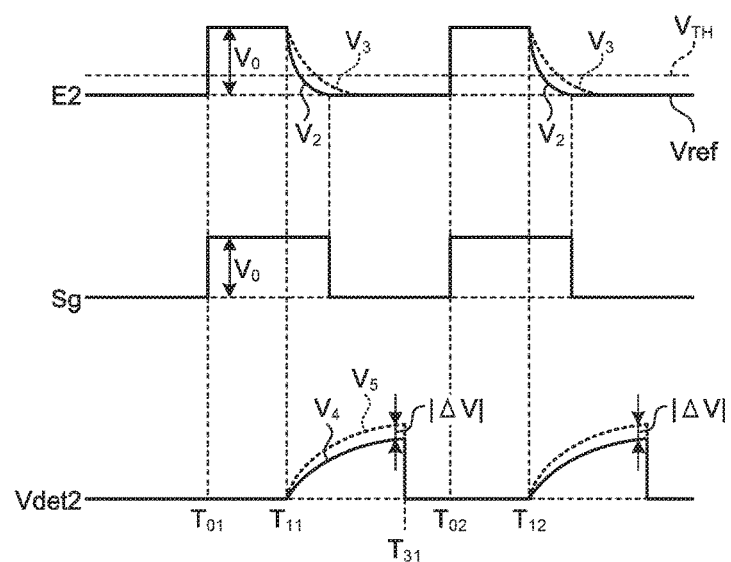
FIG. 10 is a diagram illustrating an example of waveforms of a drive signal and a second detection signal of the self-capacitive touch detection.

Subsequently, the basic principle of self-capacitive touch detection will be described with reference to FIGS. 9 and 10. FIG. 9 is an explanatory diagram illustrating an example of an equivalent circuit of the self-capacitive touch detection. FIG. 10 is a diagram illustrating an example of waveforms of a drive signal and a second detection signal of the self-capacitive touch detection. FIG. 9 illustrates a detection circuit together with the equivalent circuit.

As illustrated in FIG. 9, the voltage detector DET is coupled with the detection electrode E2. In a state in which the conductor such as the finger is neither in contact with nor in proximity to the display apparatus (non-contact state), the voltage detector DET converts variation of a current according to the AC rectangular wave Sg into variation of a voltage (a waveform $V_4$ indicated by the solid line illustrated in FIG. 10). In a state in which the conductor or the like is in contact with or is in proximity to the display apparatus (contact state), capacitance C4 between the conductor and the detection electrode E2 is added to capacitance C3 of the detection electrode E2. When the AC rectangular wave Sg is applied to the detection electrode E2, a current according to the capacitance C3 and C4 flows through the detection electrode E2. The voltage detector DET converts variation of the current according to the AC rectangular wave Sg into variation of a voltage (a waveform $V_5$ indicated by the dotted line). Whether there is the conductor in contact with or in proximity to the detection electrode E2 can be determined by integrating voltage values of the obtained waveforms $V_4$ and waveform $V_5$, and comparing the integrated values. As illustrated in FIG. 9, the detection electrode E2 can be disconnected from a power source by a switch SW1 and from the voltage detector DET by a switch SW2. Whether there is the conductor in contact with or in proximity to the detection electrode E2 may be determined on the basis of a period until a waveform $V_2$ and a waveform $V_3$ illustrated in FIG. 9 are lowered to a predetermined reference voltage $V_{TH}$.

In FIG. 10, the AC rectangular wave Sg rises to a voltage level corresponding to a voltage $V_0$ at time $T_{01}$. At this time, the switch SW1 is ON and the switch SW2 is OFF. The voltage of the detection electrode E2 thus rises to the voltage $V_0$. Subsequently, the switch SW1 is turned OFF before time $T_{11}$. At this time, while the detection electrode E2 is in a floating state, a potential of the detection electrode E2 is maintained to the voltage $V_0$ by the capacitance C3 of the detection electrode E2, or the capacitance C3+C4 (see FIG. 9) obtained by adding the capacitance C4 caused by contact or proximity of the conductor to the capacitance C3 of the detection electrode E2. Further, the switch SW3 is turned ON before the time $T_{11}$ and is turned OFF after the elapse of a predetermined time to reset the voltage detector DET. By this reset operation, the second detection signal Vdet2 has a voltage substantially the same as a reference voltage Vref.

Subsequently, when the switch SW2 is turned ON at the time $T_{11}$, an inverting input unit of the voltage detector DET has the voltage $V_0$ of the detection electrode E2, and then the potential of the inserting input unit of the voltage detector DET is decreased to the reference voltage Vref according to a time constant of the capacitance C3 of the detection electrode E2 (or C3+C4) and that of capacitance C5 in the voltage detector DET. At this time, charges accumulated in the capacitance C3 of the detection electrode E2 (or C3+C4) are moved to the capacitance C5 in the voltage detector DET, which increases the second detection signal Vdet2 that is an output voltage of the voltage detector DET. When the finger or the like is not in proximity to the detection electrode E2, the second detection signal Vdet2 as an output voltage of the voltage detector DET has the waveform $V_4$ indicated by the solid line, and Vdet2=C3×$V_0$/C5 is satisfied. When capacitance caused by the influence of the finger or the like is added, the second detection signal Vdet2 as an output voltage of the voltage detector DET has the waveform $V_5$ indicated by the solid line, and Vdet2=(C3+C4)×$V_0$/C5 is satisfied. Subsequently, at time $T_{31}$ after charges of the capacitance C3 of the detection electrode E2 (or C3+C4) have been sufficiently moved to the capacitance C5, the switch SW2 is turned OFF and the switch SW1 and a switch SW3 are turned ON to cause the potential of the detection electrode E2 to be at a low level that is the same level as the potential of the AC rectangular wave Sg and reset the voltage detector DET.

The above operation is repeated at a predetermined frequency (e.g., about several kHz to several hundreds of kHz). Whether there is the external proximity object (whether there is the conductor or whether there is a touch) can be detected on the basis of an absolute value |ΔV| of a difference between the waveform $V_4$ and the waveform $V_5$. For example, as illustrated in FIG. 1, the signal processor 44 compares the signal (absolute value |ΔV| of the difference caused by the detected finger with a predetermined threshold voltage. When the signal is less than the threshold voltage, the signal processor 44 determines that the external proximity object is in the non-contact state. On the other hand, when the difference is equal to or larger than the threshold voltage, the signal processor 44 determines that the external proximity object is in the contact state. The coordinate extractor 45 calculates touch panel coordinates, and outputs the touch panel coordinates as a detection signal output Vout. In this way, the detector 40 can perform touch detection on the basis of the basic principle of the self-capacitive touch detection.

The above has described the detection of the external proximity object when the finger comes in contact with or in proximity to the display apparatus, with reference to FIGS. 9 and 10. Force applied to an input surface can also be detected on the basis of the above-described self-capacitive detection principle by providing an electric conductor facing the detection electrode E2. In this case, a distance between the detection electrode E2 and the electric conductor is changed according to the force applied to the input surface of the display device 10 with a touch detection function, which changes capacitance formed between the detection electrode E2 and the electric conductor. The touch panel 30 outputs the second detection signal Vdet2 according to the change of the capacitance to the detection signal amplifier 42.

The detection signal amplifier 42, the A/D converter 43, and the signal processor 44 perform the above-described signal processing, thereby obtaining the above-described absolute value |ΔV| of the difference. The distance between the detection electrode E2 and the electric conductor is obtained in accordance with the absolute value |ΔV|. The force applied to the input surface is thus calculated. The storage 47 temporarily stores information about the force calculated by the signal processor 44. The storage 47 may be a random access memory (RAM), a read only memory (ROM), a register circuit, or the like. The coordinate extractor 45 receives a plurality of pieces of information about force from the storage 47, calculates force at the input position from a distribution of the force applied to the input surface and the touch panel coordinates obtained from the touch detection, and then outputs the information about the force as an output signal.

Figure 11:
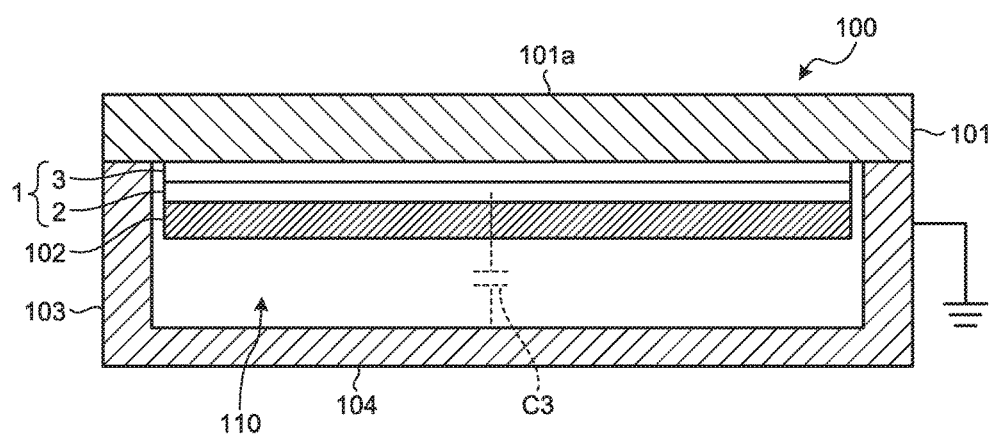
FIG. 11 is a sectional view illustrating a schematic cross sectional structure of an electronic apparatus including a display apparatus with a touch detection function.

FIG. 11 is a sectional view illustrating a schematic cross sectional structure of an electronic apparatus including the display apparatus with a touch detection function. An electronic apparatus 100 includes a cover member 101, the display apparatus 1 with a touch detection function, a backlight 102, and a housing 103. The cover member 101 is a protection member that protects the display apparatus 1 with a touch detection function, and may be a glass substrate having light-transmission properties, or a film base material using a resin, for example. One surface of the cover member 101 is an input surface 101a on which an input operation is performed by the finger or the like coming in contact therewith or in proximity thereto. The display apparatus 1 with a touch detection function includes an array substrate 2 and a counter substrate 3, which will be described below. The counter substrate 3 is provided on the array substrate 2, and the counter substrate 3 is arranged on the other surface of the cover member 101, that is, a surface opposite to the input surface 101a.

The backlight 102 is provided on the display apparatus 1 with a touch detection function on an opposite side to the cover member 101 side. The backlight 102 may be bonded to a lower surface side of the array substrate 2, or may be arranged with a predetermined interval from the array substrate 2. The backlight 102 includes a light source such as a light emitting diode (LED), and emits light from the light source toward the array substrate 2. The light from the backlight 102 passes through the array substrate 2, and switching between a portion where the light is blocked and a portion where the light is emitted according to the state of liquid crystals at the position causes an image to be displayed on the input surface 101a of the cover member 101. The backlight 102 can employ a known illumination unit, and various configurations. When the display panel 20 of the display apparatus 1 with a touch detection function is a reflective liquid crystal display apparatus, the backlight 102 may not be provided. The reflective liquid crystal display apparatus has a reflective electrode provided on the array substrate 2. The light entering from the cover member 101 side is reflected by the reflective electrode, passes through the cover member 101, and reaches the eyes of an observer. The reflective liquid crystal display apparatus may be provided with a front light in place of the backlight 102.

The housing 103 is a box-like member having an opening at an upper portion, and is provided with the cover member 101 so as to cover the opening of the housing 103. The display apparatus 1 with a touch detection function, the backlight 102, and the like are housed in an internal space formed by the housing 103 and the cover member 101. As illustrated in FIG. 11, the display apparatus 1 with a touch detection function and the backlight 102 are arranged on the cover member 101 side, and a gap 110 is provided between the backlight 102 and a bottom portion of the housing 103. The housing 103 is made of a conductive material such as metal, and the bottom portion of the housing 103 functions as an electric conductor 104 facing the first sensor electrode COML (not illustrated) of the display apparatus 1 with a touch detection function. The housing 103 is electrically coupled with the ground. With such a configuration, the capacitance C3 is formed between the first sensor electrode COML (not illustrated) of the display apparatus 1 with a touch detection function and the electric conductor 104.

Applying the force to the input surface 101a deforms the array substrate 2 and the counter substrate 3 such that they become slightly warped towards the bottom portion side of the housing 103 together with the cover member 101. The display apparatus 1 with a touch detection function detects change of the capacitance C3 on the basis of the above-described self-capacitive detection principle, which allows a warping amount of the cover member 101, the display apparatus 1 with a touch detection function, and the backlight 102 to be obtained. This allows the force applied to the input surface 101a to be obtained.

An elastic body such as sponge or elastic rubber that is deformable according to the input force may be provided in the gap 110 between the backlight 102 and the bottom portion of the housing 103. The material of the housing 103 is not limited to the conductive material such as metal, and may be an insulating material such as a resin. In this case, a metal layer may be provided to at least the bottom portion of the housing 103 and may be used as the electric conductor 104.

Figure 12:
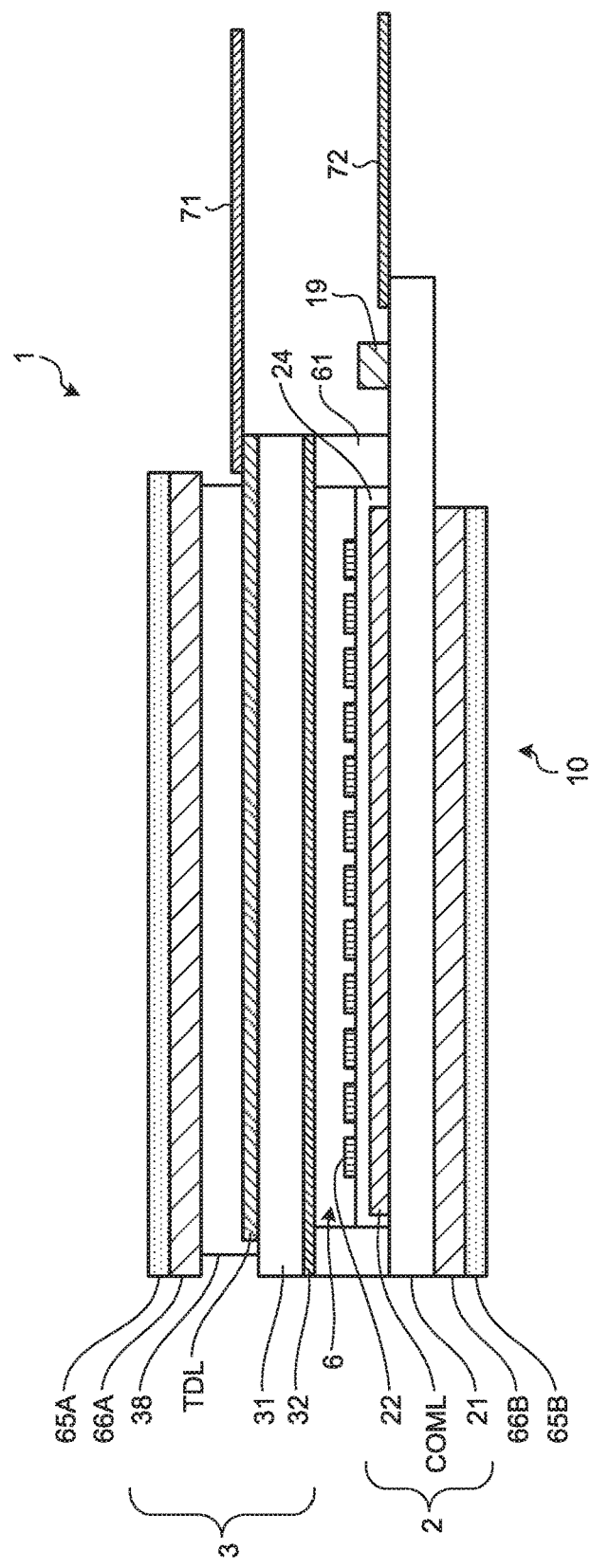
FIG. 12 is a sectional view illustrating a schematic cross section structure of the display apparatus with a touch detection function according to the first embodiment.
Figure 13:
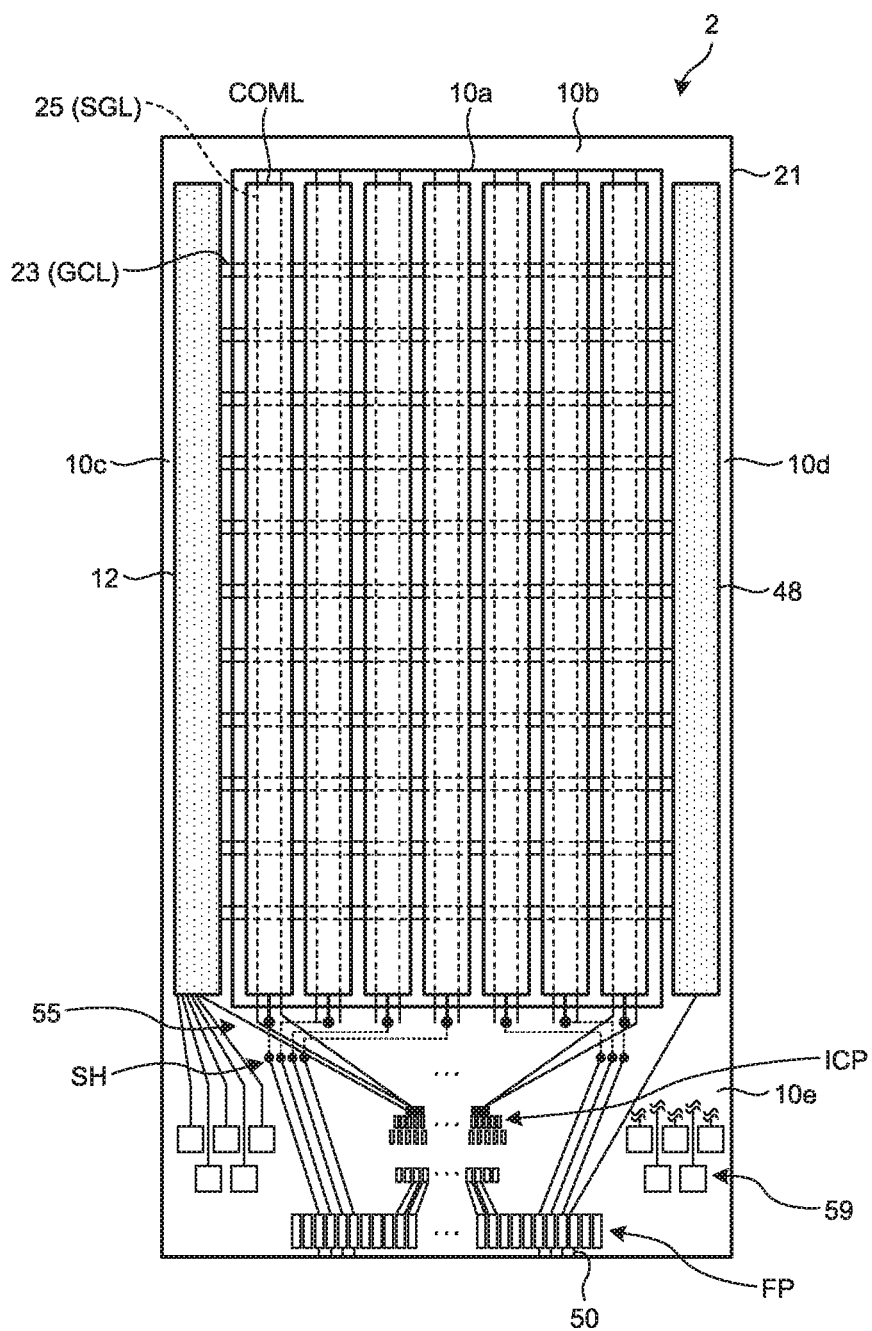
FIG. 13 is a plan view schematically illustrating a first substrate of the display apparatus with a touch detection function according to the first embodiment.
Figure 14:
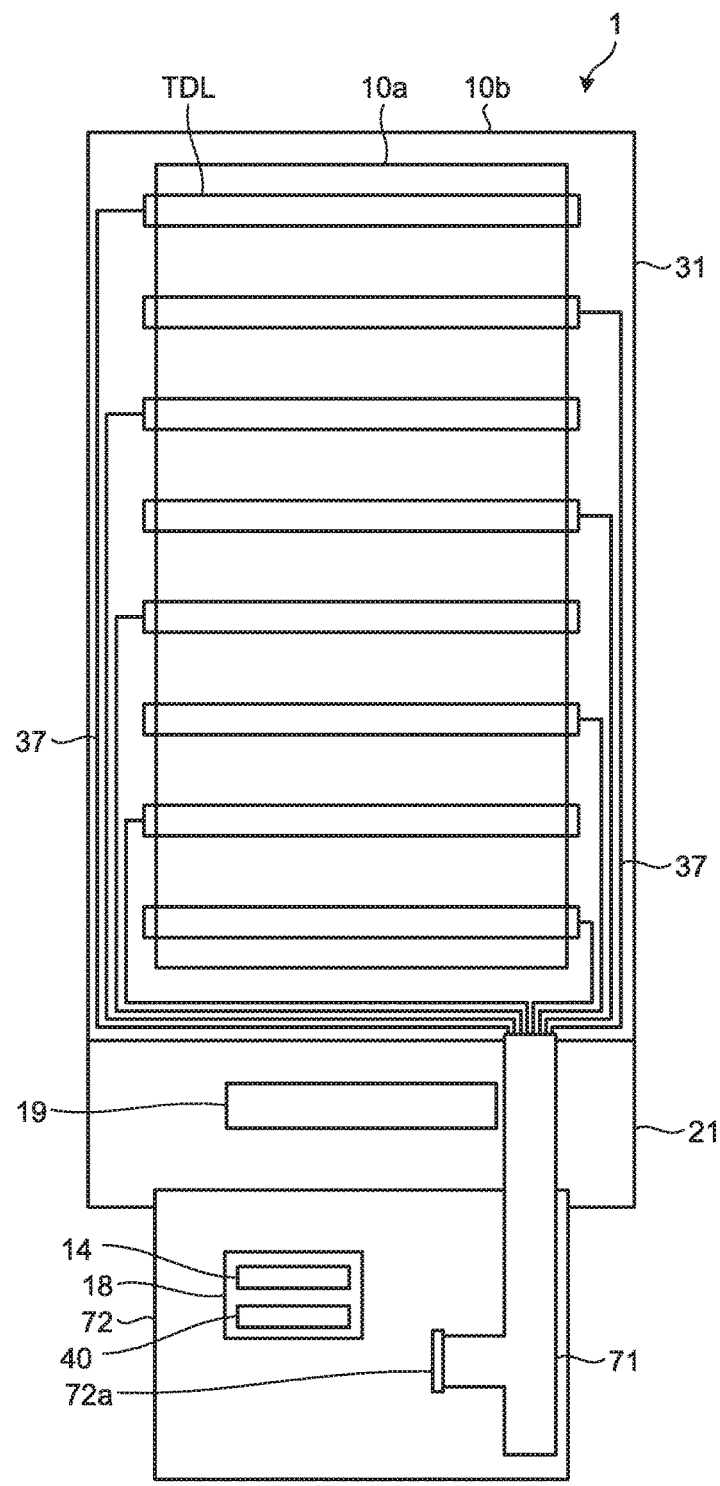
FIG. 14 is a plan view schematically illustrating a second substrate of the display apparatus with a touch detection function according to the first embodiment.

Subsequently, a configuration example of the display apparatus 1 with a touch detection function will be described in detail. FIG. 12 is a sectional view illustrating a schematic cross section structure of the display apparatus with a touch detection function according to the first embodiment. FIG. 13 is a plan view schematically illustrating a first substrate of the display apparatus with a touch detection function. FIG. 14 is a plan view schematically illustrating a second substrate of the display apparatus with a touch detection function.

As illustrated in FIG. 12, the display device 10 with a touch detection function includes the array substrate 2, the counter substrate 3 arranged to face the array substrate 2 in a direction perpendicular to a surface of the array substrate 2, and a liquid crystal layer 6 serving as a display function layer interposed between the array substrate 2 and the counter substrate 3.

The array substrate 2 includes a first substrate 21 as a circuit substrate, a pixel electrode 22, the first sensor electrodes COML, and an insulating layer 24. A thin film transistor (TFT) as a switching element is arranged on the first substrate 21 so as to correspond to the pixel electrode 22. The pixel electrode 22 is provided above the first substrate 21, and a plurality of pixel electrodes 22 is arranged in a matrix in plan view. A plurality of first sensor electrodes COML is provided between the first substrate 21 and the pixel electrodes 22. The insulating layer 24 insulates the pixel electrodes 22 and the first sensor electrodes COML from each other. A polarizing plate 65B may be provided below the first substrate 21 through an adhesive layer 66B.

The first substrate 21 is provided with a first control integrated circuit (hereinafter, referred to as the first control IC) 19. The first control IC 19 is a chip-on-glass (COG) mounted on the first substrate 21, and has the above-described controller 11 built therein. A flexible substrate 72 is coupled with an end portion of the first substrate 21. The first control IC 19 outputs a control signal to a scanning signal line GCL and a pixel signal line SGL described below and the like, in accordance with the video signal Vdisp (see FIG. 1) supplied from an external host IC (not illustrated).

The counter substrate 3 includes a second substrate 31 and a color filter 32 formed on one surface of the second substrate 31. The second sensor electrode TDL that is a detection electrode of the touch panel 30 is provided on the other surface of the second substrate 31. A protection layer 38 is provided on the second sensor electrode TDL. Further, a polarizing plate 65A is provided above the second sensor electrode TDL through an adhesive layer 66A. A flexible substrate 71 is coupled with the second substrate 31. The flexible substrate 71 is coupled with the second sensor electrode TDL through a frame line described below. The color filter 32 may be arranged on the first substrate 21. In the present embodiment, the first substrate 21 and the second substrate 31 are, for example, glass substrates.

The first substrate 21 and the second substrate 31 are arranged to face each other with a predetermined interval interposed therebetween by a spacer 61. The liquid crystal layer 6 is provided in a space between the first substrate 21 and the second substrate 31. The liquid crystal layer 6 modulates light passing therethrough according to the state of an electric field, and employs liquid crystals of an in-plane electric field mode, such as an in-plane switching (IPS) mode including a fringe field switching (FFS) mode. An orientation film may be arranged between the liquid crystal layer 6 and the array substrate 2, and between the liquid crystal layer 6 and the counter substrate 3 illustrated in FIG. 12.

As illustrated in FIG. 13, the display apparatus 1 with a touch detection function includes a display region 10a for displaying an image, and frame regions 10b, 10c, 10d, and 10e outside the display region 10a. The display region 10a has a rectangular shape. The frame regions 10b, 10c, 10d, and 10e have a frame shape surrounding four sides of the display region 10a. The frame region 10b and the frame region 10e are arranged to face each other across the display region 10a, and the frame region 10c and the frame region 10d are arranged to face each other across the display region 10a.

The first sensor electrodes COML are provided in the display region 10a of the first substrate 21. The first sensor electrodes COML extend in a direction along a long side of the display region 10a, and are arrayed in a direction along a short side of the display region 10a. The first sensor electrode COML is, for example, a patterned light-transmissive conductive layer (also called conductor film or conductor pattern), and is made of, for example, a conductive material having light-transmission properties such as indium tin oxide (ITO), indium zinc oxide (IZO), and tin oxide (SnO).

The gate lines 23 in the display region 10a extend in a first direction along one side of the display region 10a. The gate lines 23 are arrayed in a second direction along the other side of the display region 10a at a predetermined interval. The gate lines 23 overlaps with the first sensor electrodes COML and extend in a direction intersecting with the extending direction of the first sensor electrodes COML, and the gate lines 23 are arrayed in the extending direction of the first sensor electrodes COML.

Source lines 25 in the display region 10a extend in the second direction. The source lines 25 are arrayed in the first direction at a predetermined interval. The source lines 25 overlap with the first sensor electrodes COML, and extend in the extending direction of the first sensor electrodes COML.

As illustrated in FIGS. 13 and 14, the first control IC 19 is arranged in the frame region 10e of the first substrate 21, and the gate driver 12 and the second sensor driver 48 are arranged in the frame regions 10c and 10d, respectively. The flexible substrate 72 is coupled with the first substrate 21 on the frame region 10e side. The first sensor driver 14 and the flexible substrate 72 are arranged on the frame region 10e side of the first substrate 21 that is near an end portion of the first sensor electrodes COML in the extending direction. Arranging the first sensor driver 14 and the flexible substrate 72 in the frame regions 10c and 10d requires wiring pulled out from the first sensor electrodes COML to be routed along the frame regions 10c and 10d. On the other hand, arranging the first sensor driver 14 and the flexible substrate 72 in the frame region 10e can shorten the length of the wiring pulled out from the first sensor electrodes COML, and reduce the area of the frame region 10b. FIG. 13 illustrates the array substrate 2 before the first control IC 19 and the flexible substrate 72 are mounted thereon. FIG. 14 illustrates a plan view of the display apparatus 1 with a touch detection function, in which the second sensor electrode TDL, the second substrate 31, and the like are further mounted on the array substrate 2 after the first control IC 19 and the flexible substrate are mounted thereon.

The gate lines 23 are used as the scanning signal lines GCL described below, and thus are selectively coupled with the second sensor driver 48 and the gate driver 12 in a time division manner, and are supplied with signals from each of the second sensor driver 48 and the gate driver 12. In FIG. 13, the second sensor driver 48 is arranged in the frame region 10d, and the gate driver 12 is arranged in the frame region 10c. The present disclosure is not limited thereto, and the second sensor driver 48 and the gate driver 12 are arranged in both the frame regions 10c and 10d, or may be arranged in one of the frame region 10c and the frame region 10d.

As illustrated in FIG. 13, pads FP for external coupling to be coupled with the flexible substrate 72 illustrated in FIG. 14, pads ICP for IC coupling to be coupled with the first control IC 19, and pads 59 for display inspection are arranged in the frame region 10e. The pad 59 for display inspection is an electrode with which a probe is brought in contact, to inspect one of the pixel electrode 22, the gate line 23, and the source line 25. Some of the pads 59 for display inspection are coupled with the gate driver 12, the other pads 59 for display inspection are coupled with the source lines 25 through source inspection lines or the like. A plurality of display frame lines 55 pulled out from the first control IC 19 and electrically coupled with the gate lines 23 and the source lines 25 is arranged in the frame region 10e.

As illustrated in FIG. 14, the second sensor electrodes TDL are provided in the display region 10a of the second substrate 31. The second sensor electrodes TDL extend in the first direction of the display region 10a, and are arrayed in the second direction of the display region 10a. The second sensor electrode TDL is made of, for example, a conductive material having light-transmission properties such as ITO, IZO, and SnO. The material of the second sensor electrode TDL is not limited thereto, and a thin metal wire using a metal material may constitute the second electrode TDL, for example. Frame lines 37 are coupled with end portions of the second sensor electrodes TDL. The frame lines 37 extend along a long side of the frame region 10b, and are coupled with the flexible substrate 71 provided on a short side of the second substrate 31. A second control integrated circuit (hereinafter, referred to as second control IC) 18 is mounted on the flexible substrate 72. The detector 40 illustrated in FIG. 1 is mounted on the second control IC 18, and the first detection signal Vdet1 output from the second sensor electrode TDL is supplied to the second control IC 18 through the frame line 37 and the flexible substrate 71. The first sensor driver 14 illustrated in FIG. 1 is mounted on the second control IC 18 of the first embodiment.

In the present embodiment, the second control IC 18 is a touch driver IC including a detector 40 and mounted on the flexible substrate 71. The present disclosure is not limited to this embodiment, and a part or all of the functions of the detector 40 may be provided as the functions of another micro-processing unit (MPU). To be specific, among various functions such as A/D conversion and noise removal that can be provided as the functions of the touch driver IC, some functions (e.g., noise removal) may be implemented in a circuit such as the MPU provided separately from the touch driver IC.

The flexible substrate 71 is coupled with the flexible substrate 72 through a connector 72a. The second control IC 18 may include a part or all of the functions of the second sensor driver 48 (see FIG. 1). In this case, the DC voltage signal Vdc or the guard signal Vsg1 is supplied from the second control IC 18 to the gate lines 23 through the flexible substrate 71 and the flexible substrate 72.

Figure 15:
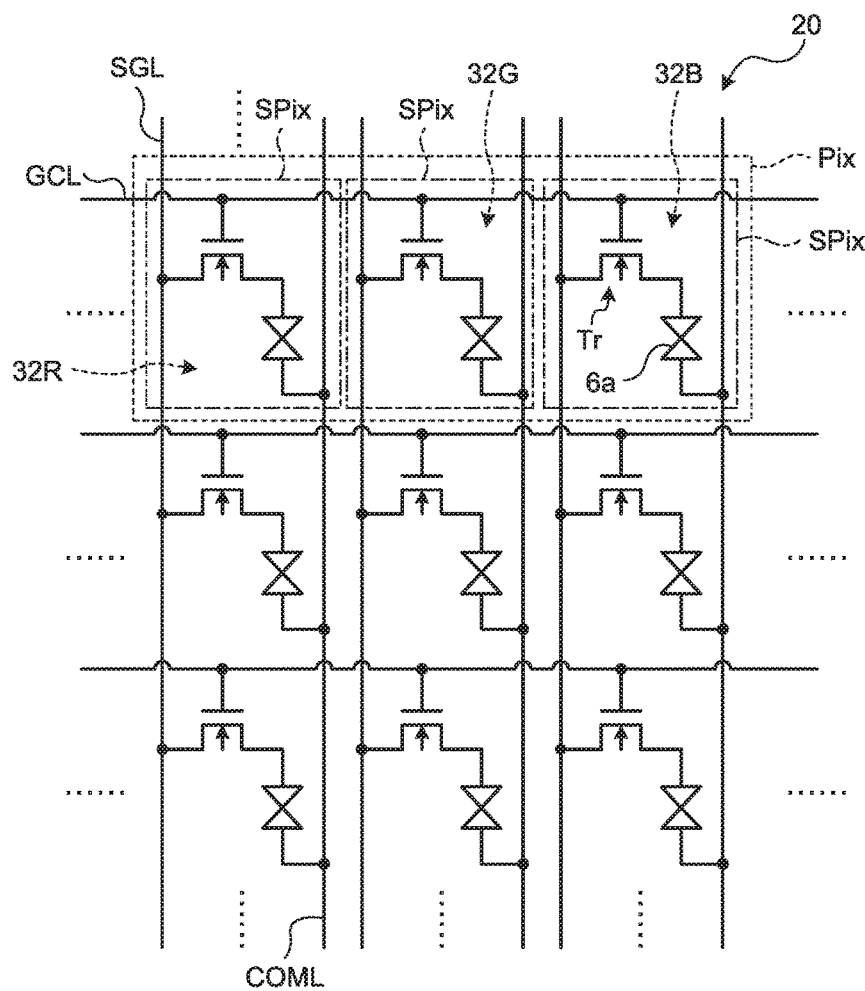
FIG. 15 is a circuit diagram illustrating a pixel array of a display device with a touch detection function according to the first embodiment.

Subsequently, a display operation of the display panel 20 will be described. FIG. 15 is a circuit diagram illustrating a pixel array of a display device with a touch detection function according to the first embodiment. Switching elements (hereinafter, TFT elements) Tr of the sub-pixels SPix illustrated in FIG. 15, and wiring such as pixel signal lines SGL that supply the pixel signals Vpix to the pixel electrodes 22, and scanning signal lines GCL that supply drive signals for driving the TFT elements Tr are formed on the first substrate 21 (see FIG. 12). The pixel signal lines SGL and the scanning signal lines GCL extend in a plane parallel to a surface of the first substrate 21.

The display panel 20 illustrated in FIG. 15 includes the sub-pixels SPix arrayed in a matrix. The sub-pixels SPix each include the TFT element Tr. A thin film transistor constitutes the TFT element Tr. In this example, an n-channel metal oxide semiconductor (MOS) TFT constitutes the TFT element Tr. The source of the TFT element Tr is coupled with the pixel signal line SGL, and the gate thereof is coupled with the scanning signal line GCL. The drain of the TFT element Tr is coupled with an end of the pixel electrode 22 (see FIG. 12), and capacitance 6a formed with the liquid crystal layer 6 exists between the pixel electrode 22 (see FIG. 12) and the first sensor electrode COML (see FIG. 12).

The sub-pixel SPix is coupled with the other sub-pixels SPix belonging to the same row in the display panel 20 by the scanning signal line GCL. The scanning signal line GCL is coupled with the gate driver 12 (see FIG. 1), and is supplied with the scanning signal Vscan from the gate driver 12. The sub-pixel SPix is coupled with the other sub-pixels SPix belonging to the same column in the display panel 20 by the pixel signal line SGL. The pixel signal line SGL is coupled with the source driver 13 (see FIG. 1), and is supplied with the pixel signal Vpix from the source driver 13. Further, the sub-pixel SPix is coupled with the other sub-pixels SPix belonging to the same column by the first sensor electrode COML. The first sensor electrode COML is coupled with the first sensor driver 14 (see FIG. 1), and is supplied with the first drive signal Vcom from the first sensor driver 14. That is, in this example, the sub-pixels SPix belonging to the same column shares one first sensor electrode COML. The direction in which the first sensor electrode COML of the present embodiment extends is substantially the same as the direction in which the pixel signal line SGL extends.

The gate driver 12 illustrated in FIG. 1 performs drive by sequentially scanning the scanning signal lines GCL. The gate driver 12 sequentially selects one row (one horizontal line) of the sub-pixels SPix as a target of display drive by applying the scanning signal Vscan (see FIG. 1) to the gates of the TFT elements Tr of the sub-pixels SPix through the scanning signal line GCL. The source driver 13 supplies the pixel signal Vpix to the sub-pixels SPix constituting the selected one horizontal line through the pixel signal line SGL. Then, in these sub-pixels SPix, display is performed for one horizontal line in accordance with the supplied pixel signal Vpix. In performing this display operation, the first sensor driver 14 applies the first drive signal Vcom to all the first sensor electrodes COML. The first sensor driver 14 is supplied with a common potential by the first drive signal Vcom in the display operation.

In the color filter 32 illustrated in FIG. 12, color regions colored in three colors including red (R), green (G), and blue (B), for example, may be periodically arrayed. Color regions 32R, 32G, and 32B respectively colored in R, G, and B correspond to the respective sub-pixels SPix illustrated in FIG. 15, and a set of these sub-pixels SPix constitutes the pixel Pix. As illustrated in FIG. 12, the color filter 32 faces the liquid crystal layer 6 in a direction perpendicular to the first substrate 21. The color filter 32 may have a combination of other colors as long as the colors are different from one another. The color filter 32 is not limited to having the combination of three colors, and may have a combination of four colors.

As illustrated in FIG. 15, in the present embodiment, the first sensor electrodes COML extend in the direction parallel to the extending direction of the pixel signal lines SGL, which is the direction intersecting with the extending direction of the scanning signal lines GCL. Therefore, wiring from the first sensor electrodes COML can be pulled out to the frame region 10e (see FIG. 13). The first sensor electrodes COML are not limited to the above configuration, and may extend in a direction parallel to the scanning signal lines GCL, for example.

Figure 16:
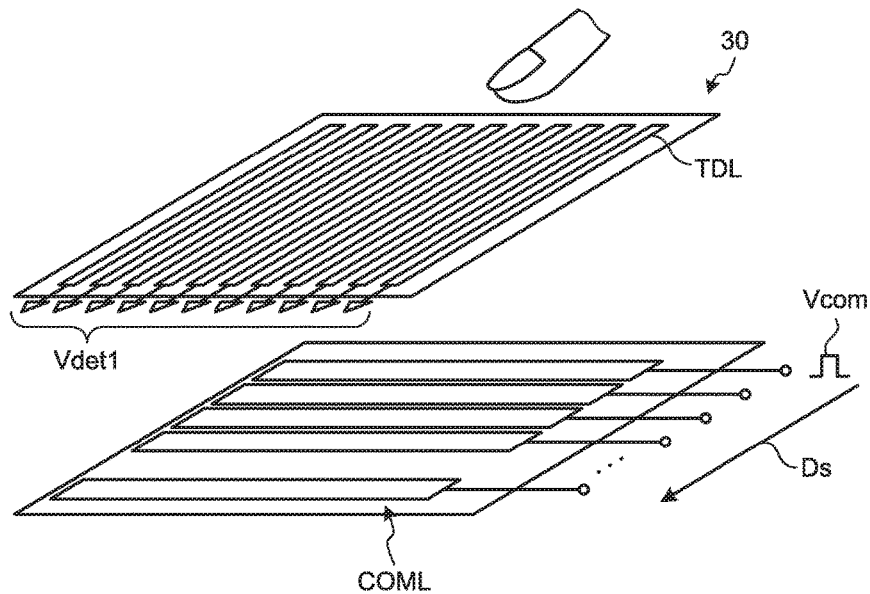
FIG. 16 is a perspective view illustrating a configuration example of drive electrodes and detection electrodes of the display device with a touch detection function according to the first embodiment.

The first sensor electrodes COML illustrated in FIGS. 12 and 13 function as common electrodes that provide a common potential to the pixel electrodes 22 of the display panel 20, and also function as drive electrodes when the touch panel 30 performs the touch detection by the mutual capacitance method. The first sensor electrodes COML may function as detection electrodes when the touch panel 30 performs the touch detection by the self-capacitance method. FIG. 16 is a perspective view illustrating a configuration example of drive electrodes and detection electrodes of the display device with a touch detection function according to the first embodiment. The first sensor electrodes COML provided on the array substrate 2 and the second sensor electrodes TDL provided on the counter substrate 3 constitute the touch panel 30.

The first sensor electrodes COML include a plurality of stripe electrode patterns extending in a lateral direction in FIG. 16. The second sensor electrodes TDL include a plurality of electrode patterns extending in the direction intersecting with the extending direction of the electrode patterns of the first sensor electrodes COML. Then, the second sensor electrodes TDL face the first sensor electrodes COML in the direction perpendicular to the surface of the first substrate 21 (see FIG. 12). The electrode patterns of the second sensor electrodes TDL are coupled with input terminals of the detection signal amplifier 42 of the detector 40 (see FIG. 1). Capacitance is formed in an intersection between each of the electrode patterns of the first sensor electrodes COML and each of the electrode patterns of the second sensor electrodes TDL.

The shape of the second sensor electrodes TDL and that of the first sensor electrodes COML are not limited to the shape divided in a stripe manner For example, the second sensor electrodes TDL and the first sensor electrodes COML may have a comb-like shape. The second sensor electrodes TDL and the first sensor electrodes COML only need to be divided into a plurality of sections, and the shape of a slit that divides the first sensor electrodes COML may be a straight line or a curved line.

With this configuration, when the touch panel 30 performs the mutual capacitive touch detection operation, the first sensor driver 14 performs drive by sequentially scanning each one supply unit of the first sensor electrode(s) COML in a time division manner, and thus sequentially selects one supply unit of the first sensor electrode(s) COML in a scanning direction Ds. This configuration causes the first detection signal Vdet1 to be output from the second sensor electrode TDL, and thus allows the touch detection to be performed. That is, the one supply unit of the first sensor electrode(s) COML corresponds to the drive electrode E1 described in the basic principle of the mutual capacitive touch detection, and the second sensor electrode TDL corresponds to the detection electrode E2. The touch panel 30 thus detects the touch input according to the basic principle. As illustrated in FIG. 16, in the touch panel 30, the second sensor electrodes TDL and the first sensor electrodes COML intersecting with one another constitute capacitance touch sensors in a matrix. Therefore, scanning the entire touch detection surface of the touch panel 30 enables detection of a position of contact or proximity of the external conductor.

Figure 17:
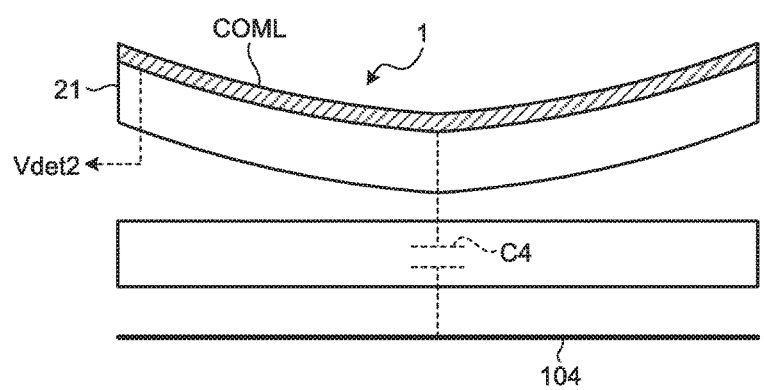
FIG. 17 is an explanatory diagram for describing force detection of the display apparatus with a touch detection function according to the first embodiment.

FIG. 17 is an explanatory diagram for describing force detection of the display apparatus with a touch detection function according to the first embodiment. As described above, arranging the electric conductor 104 (e.g., the housing 103) so as to be separated from the first substrate 21 and face the first sensor electrodes COML causes the capacitance C4 to be formed between the first sensor electrode COML and the electric conductor 104. Applying force to the input surface 101a (see FIGS. 11 to 13) of the cover member 101 deforms the cover member 101 such that it becomes slightly warped toward the electric conductor 104 side according to the force. The warping of the first substrate 21 of the display apparatus 1 with a touch detection function together with the cover member 101 reduces the interval between the first sensor electrode COML and the electric conductor 104, and increases the capacitance C4.

The second detection signal Vdet2 is output from the first sensor electrode COML, as illustrated in FIG. 17, on the basis of the self-capacitive detection principle. That is, the first sensor electrode COML corresponds to the detection electrode E2 in the self-capacitive detection principle. In the present embodiment, the first sensor electrode COML functions as: the common electrode that provides the common potential to the pixel electrode 22 of the display panel 20; the drive electrode when the touch panel 30 performs the touch detection by the mutual capacitance method; and the detection electrode when the touch panel 30 performs the force detection by the self-capacitance method. The magnitude of the force applied to the input surface 101a can be detected in accordance with the second detection signals Vdet2 output from the respective first sensor electrodes COML.

Figure 18:
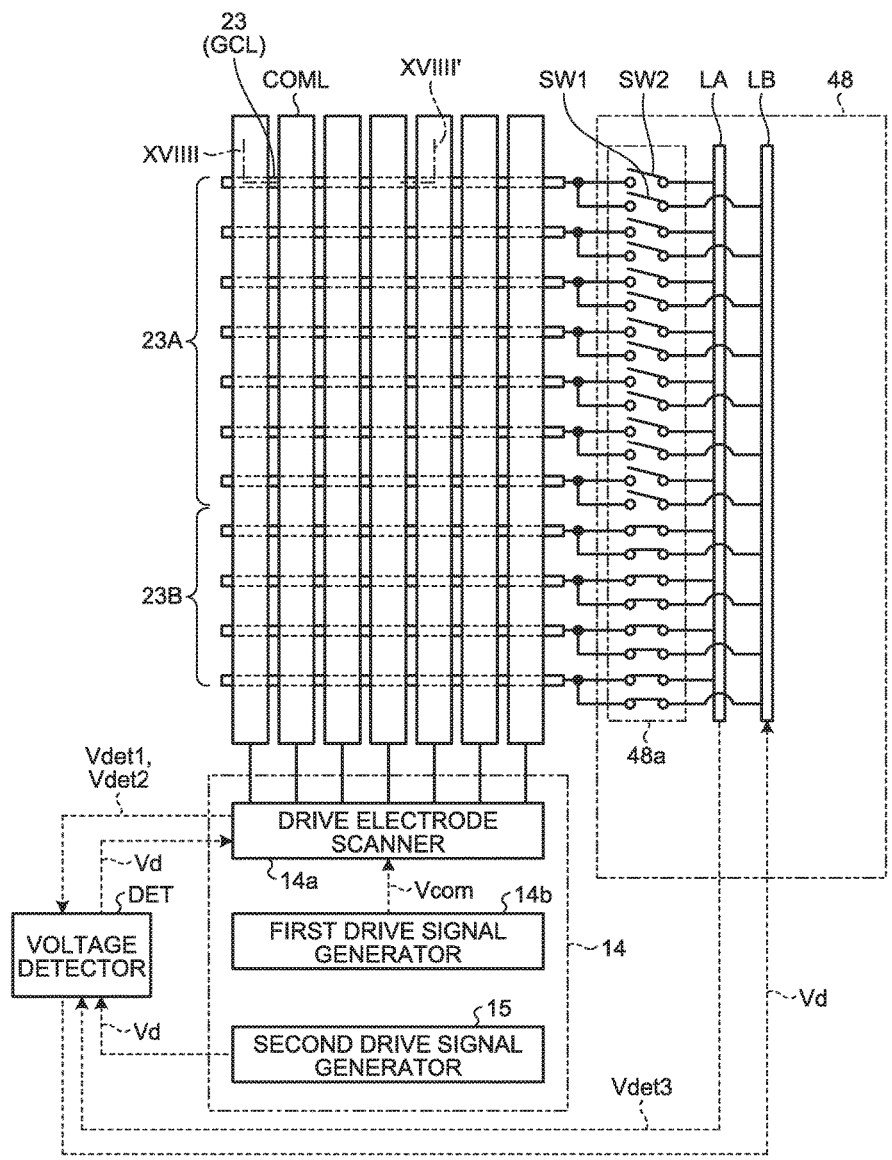
FIG. 18 is an enlarged schematic plan view illustrating drive electrodes and wiring according to the first embodiment.

Similarly, as illustrated in FIG. 18, a gate line 23A selected by the second sensor driver 48 serves as a third sensor electrode to output a third detection signal Vdet3 on the basis of the self-capacitive detection principle. That is, the gate line 23A corresponds to the detection electrode E2 in the self-capacitive detection principle. In the present embodiment, the gate line 23A functions as the scanning line GCL of the display panel 20, and also as the detection electrode at the time of the force detection by the self-capacitance method. This configuration allows the magnitude of the force applied to the input surface 101a to be detected in accordance with the third detection signals Vdet3 output from the respective gate lines 23A. The configuration also allows a distribution of values of planar force applied to the input surface 101a to be grasped in accordance with the second detection signals Vdet2 and the third detection signals Vdet3. In this way, the present embodiment allows the position of the touch input to be detected, and also allows the magnitude of the force applied to the touch input position to be detected. The display apparatus 1 with a touch detection function can combine and reflect these detection results to various applications.

Figure 19:
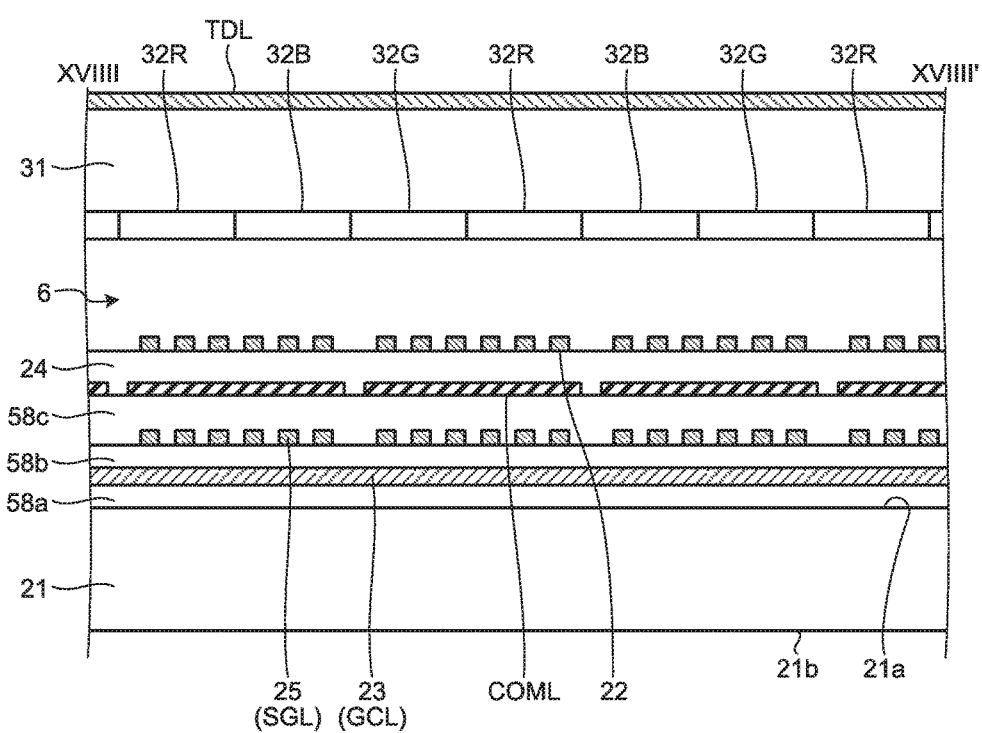
FIG. 19 is a sectional view illustrating a cross section taken along line XVIIII-XVIIII' in FIG. 18.

Subsequently, a method of driving the first sensor electrodes COML and the gate lines 23 in the force detection operation will be described. FIG. 18 is an enlarged schematic plan view illustrating drive electrodes and wiring according to the first embodiment. FIG. 19 is a sectional view illustrating a cross section taken along line XVIIII-XVIIII' in FIG. 18. As illustrated in FIG. 18, the gate lines 23 are provided so as to overlap with the first sensor electrodes COML, and extend in the direction intersecting with the extending direction of the first sensor electrodes COML. The gate lines 23 are arrayed in the extending direction of the first sensor electrodes COML.

As illustrated in FIG. 19, the gate lines 23 (scanning signal lines GCL) are provided on a first surface 21a side on the first substrate 21 through an insulating layer 58a. In the present embodiment, a part of the gate lines 23 (scanning signal lines GCL) serves as the third sensor electrode. An insulating layer 58b is provided on the gate lines 23, and the source lines 25 (pixel signal lines SGL) are provided on the insulating layer 58b. An insulating layer 58c is provided on the source lines 25, and the first sensor electrodes COML are provided on the insulating layer 58c. The insulating layer 24 is provided on the first sensor electrodes COML, and the pixel electrodes 22 are provided on the insulating layer 24. In this way, the gate lines 23 are provided so as to be separated from the first sensor electrodes COML and be closer to the first substrate 21 than the first sensor electrodes COML. The gate lines 23 are selectively coupled with the second sensor driver 48 and the gate driver 12 illustrated in FIG. 13 in a time division manner, which requires no additional wiring to arrange the third sensor electrodes, other than the gate lines 23. Auxiliary conductive wiring made of at least one metal material among aluminum (Al), copper (Cu), silver (Ag), molybdenum (Mo), and alloys thereof may be directly provided on the first sensor electrodes COML. Arranging the auxiliary conductive wiring decreases an apparent resistance value of the first sensor electrode COML as compared with arranging only the first sensor electrode COML.

As illustrated in FIG. 18, the first sensor driver 14 includes a drive electrode scanner 14a, a first drive signal generator 14b, and a second drive signal generator 15. The first drive signal generator 14b generates and supplies the first drive signal Vcom to the drive electrode scanner 14a. In the mutual capacitive touch detection operation described above, the drive electrode scanner 14a sequentially scans the first sensor electrodes COML to select one supply unit of the first sensor electrode(s) COML, and supplies the first drive signal Vcom to the selected one supply unit of the first sensor electrode(s) COML.

The second drive signal generator 15 is coupled with the drive electrode scanner 14a through the voltage detector DET. In the self-capacitive force detection operation described above, the second drive signal generator 15 supplies the second drive signal Vd to the voltage detector DET. The drive electrode scanner 14a sequentially or simultaneously selects the first sensor electrodes COML. The potential of the selected first sensor electrodes COML is changed to become the same potential as that of the second drive signal Vd supplied to the voltage detector DET.

The electric conductor 104 (see FIGS. 11 and 17) is provided on a second surface 21b side of the first substrate 21 so as to be separated from the first substrate 21, which is not illustrated in FIG. 19. The output signals according to change of the capacitance between the first sensor electrodes COML and the electric conductor 104 are output from the respective first sensor electrodes COML to the detector 40 (see FIG. 16). The second drive signal generator 15 may be included in the second sensor driver 48, or may be mounted on the second control IC 18 (see FIG. 14). The second drive signal Vd is supplied to the drive electrode scanner 14a through the voltage detector DET. However, the second drive signal Vd may be supplied to the drive electrode scanner 14a without passing through the voltage detector DET.

As illustrated in FIG. 18, the second sensor driver 48 includes a wiring scanner 48a, a signal line LA, and a power source line LB. The wiring scanner 48a turns ON (open) and OFF (close) the switches SW1 and SW2 coupled with the gate lines 23, thereby selecting the gate lines 23A (third sensor electrodes) as detection targets, among the gate lines 23. The gate lines 23A (third sensor electrodes) illustrated in FIG. 18 function as the detection electrode E2 illustrated in FIG. 9. The switches SW1 and SW2 illustrated in FIG. 18 perform the same operation as the switches SW1 and SW2 illustrated in FIG. 9. The switches SW1 and SW2 are turned ON and OFF in accordance with a clock signal (not illustrated). The clock signal is a signal supplied from a clock signal generator included in the controller 11 (see FIG. 1), for example.

The second drive signal generator 15 is coupled with the gate lines 23 through the voltage detector DET and the power source line LB. In the self-capacitive force detection operation described above, the second drive signal generator 15 supplies the second drive signal Vd to the voltage detector DET. The wiring scanner 48a sequentially or simultaneously selects the gate lines 23 to which the second drive signal Vd is supplied.

In the example illustrated in FIG. 18, gate lines 23B among the gate lines 23, are selected as detection targets by the wiring scanner 48a, and the gate lines 23A are not selected as detection targets. That is, the switches SW2 coupled with the respective gate lines 23A are turned OFF, and no third detection signal Vdet3 is supplied from the gate lines 23A to the voltage detector DET. The switches SW2 coupled with the respective gate lines 23B are turned ON, and the third detection signal Vdet3 is supplied from the gate lines 23B to the voltage detector DET.

The wiring scanner 48a sequentially changes a combination of the gate lines 23A not selected as the detection targets and the gate lines 23B selected as the detection targets among the gate lines 23, and selects the combination multiple times. This method allows the detection of the force in a plurality of regions in the direction (the array direction of the gate lines 23) perpendicular to the extending direction of the gate lines 23. The method allows the force detection with higher resolution in the direction perpendicular to the extending direction of the gate lines 23, thereby allowing accurate detection. The method performs the force detection in a plurality of regions, which allows the coordinates of the input position of the force to be detected in the array direction of the gate lines 23.

Figure 20:
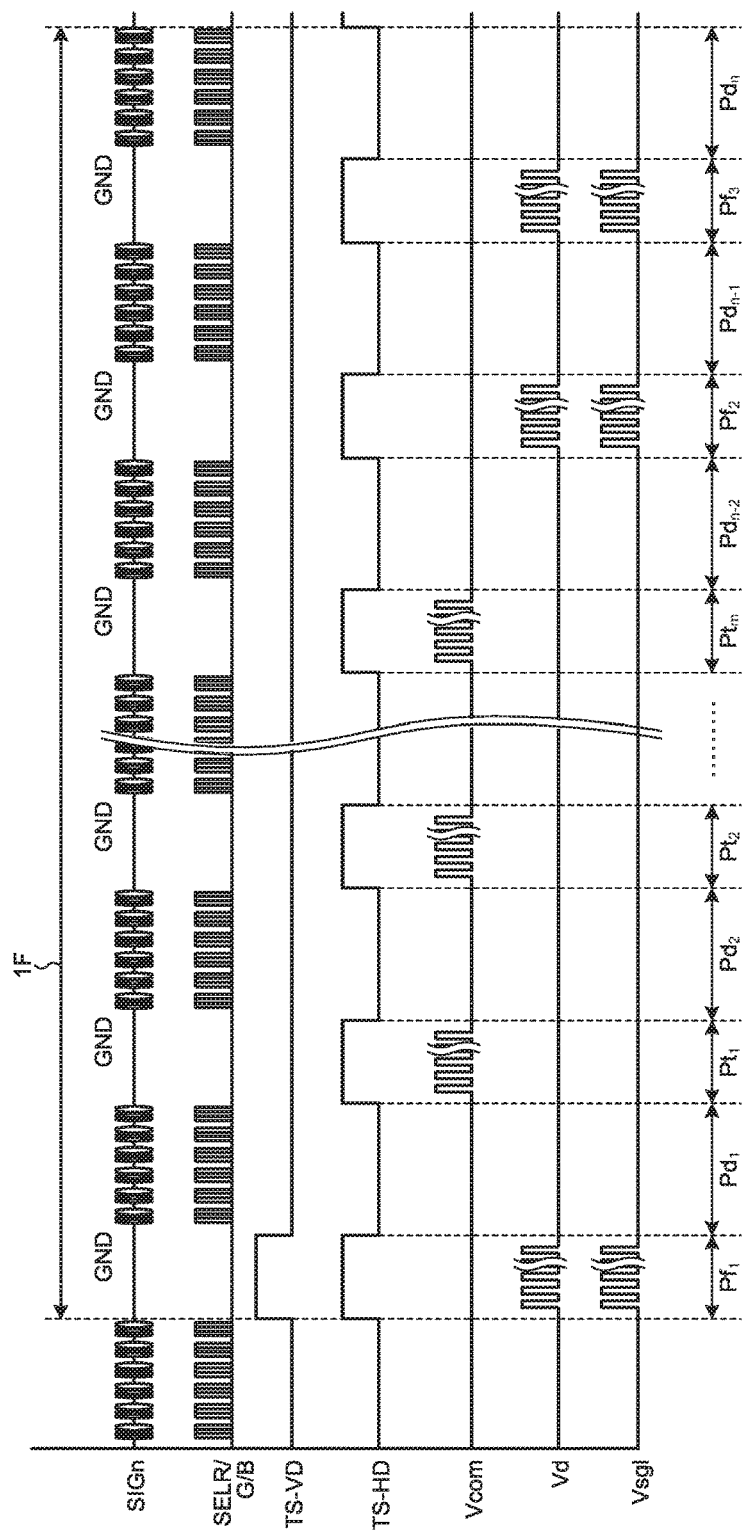
FIG. 20 is a timing waveform diagram illustrating an operation example of the display apparatus with a touch detection function according to the first embodiment.

FIG. 20 is a timing waveform diagram illustrating an operation example of the display apparatus with a touch detection function according to the first embodiment.

As an example of the method of operating the display apparatus 1 with a touch detection function, the display apparatus 1 with a touch detection function performs the touch detection operation (in a touch detection period), the force detection operation (in a force detection period), and the display operation (in a display operation period) in a time division manner The touch detection operation, the force detection operation, and the display operation may be performed in any manner as long as being performed separately. The following describes a method of performing each of the touch detection operation, the force detection operation, and the display operation multiple times, in one frame period (1F) of the display panel 20, i.e., during time required to display video information for one screen.

As illustrated in FIG. 20, when the control signal (TS-VD) is turned ON (high level), one frame period (1F) is started. A control signal (TS-HD) is repeatedly turned ON (high level) and OFF (low level) during the one frame period (1F). The touch detection operation or the force detection operation is executed in a period when the control signal (TS-HD) is turned ON, and the display operation is executed in a period when the signal (TS-HD) is turned OFF. The control signal (TS-VD) and the control signal (TS-HD) are output in accordance with the clock signal from the clock generator of the controller 11 (see FIG. 1). A plurality of display operation periods $Pd_x$ (x=1, 2, . . . , n), a plurality of touch detection periods $Pt_x$ (x=1, 2, . . . , m) in which the touch detection operation is performed, and a plurality of force detection periods $Pf_1$, $Pf_2$, and $Pf_3$ in which the force detection operation is performed constitute the one frame period (1F). These periods are alternately arranged on a time base in the order of the force detection period $Pf_1$, the display operation period $Pd_1$, the touch detection period $Pt_1$, the display operation period $Pd_2$, the touch detection period $Pt_2$, the display operation period $Pd_3$ . . . .

The controller 11 supplies the pixel signal Vpix to the pixels Pix (see FIG. 15) in a plurality of rows selected in each display operation period $Pd_x$ through the gate driver 12 and the source driver 13. FIG. 20 illustrates selection signals (SELR/G/B) for selecting the three colors, i.e., R, G, and B, and a video signal (SIGn) of each color. A corresponding sub-pixel SPix is selected according to the selection signal (SELR/G/B), and the video signal (SIGn) of each color is supplied to the selected sub-pixel SPix, so that the display operation of an image is executed. In each display operation period $Pd_x$, an image obtained by dividing video signals Vdisp for one screen by n is displayed, and the video information of the one screen is displayed in the display operation periods $Pd_1$, $Pd_2$, . . . , $Pd_n$. Since the first sensor electrodes COML also function as the common electrodes of the display panel 20, the first sensor driver 14 supplies the first drive signal Vcom as a drive and display common potential to the selected first sensor electrodes COML in the display operation period $Pd_x$.

In the touch detection period $Pt_x$ (x=1, 2, . . . , m), the controller 11 outputs the control signal to the first sensor driver 14. The first sensor driver 14 supplies the touch detection first drive signal Vcom to the first sensor electrodes COML. The detector 40 detects whether there is a touch input to the display region 10a from the first detection signal Vdet1 supplied from the second sensor electrode TDL on the basis of the basic principle of the mutual capacitive touch detection described above, and calculates the coordinates of the input position.

In the touch detection period $Pt_x$, the scanning signal lines GCL and the pixel signal lines SGL (see FIG. 15) may be in a floating state in which no voltage signal is supplied and the potential is unfixed. The scanning signal lines GCL and the pixel signal lines SGL may be supplied with a signal in synchronization with the first drive signal Vcom and having the same waveform of that of the first drive signal Vcom. This configuration prevents capacitive coupling between the first sensor electrodes COML and the scanning signal lines GCL and capacitive coupling between the first sensor electrodes COML and the pixel signal lines SGL, thereby reducing parasitic capacitance. The configuration thus prevents a decrease in detection sensitivity in the touch detection.

In the force detection periods $Pf_1$ and $Pf_3$, the controller 11 outputs the control signal to the second drive signal generator 15. The second drive signal generator 15 supplies the second drive signal Vd to the first sensor electrodes COML. The detector 40 calculates the force input to the input surface 101a (see FIG. 11, etc.) from the second detection signal Vdet2 supplied from the first sensor electrode COML, on the basis of the basic principle of the self-capacitive detection. The second drive signal generator 15 supplies the guard signal Vsg1 to the second sensor electrodes TDL in the force detection periods $Pf_1$ and $Pf_3$. Preferably, the guard signal Vsg1 is supplied from the second drive signal generator 15, and has a waveform having the same amplitude and the same frequency as those of the second drive signal Vd. However, the guard signal Vsg1 may have a different amplitude.

In the force detection period $Pf_2$, the controller 11 outputs the control signals to the second drive signal generator 15 and the second sensor driver 48. The second sensor driver 48 supplies the second drive signal Vd from the second drive signal generator 15 to the gate lines 23B. The detector 40 calculates the force input to the input surface 101a (see FIG. 11, etc.) from the third detection signal Vdet3 supplied from the gate line 23B, on the basis of the self-capacitive detection principle. The second drive signal generator 15 supplies the guard signal Vsg1 to the second sensor electrodes TDL in the force detection period $Pf_2$. Preferably, the guard signal Vsg1 has a waveform having the same amplitude and the same frequency as those of the second drive signal Vd. However, the guard signal Vsg1 may have a different amplitude.

The force detection periods $Pf_1$, $Pf_2$, and $Pf_3$ are arranged in periods different from the touch detection periods $Pt_x$ (x=1, 2, . . . , m). The second sensor electrodes TDL can thus serve as the guard electrodes in the force detection periods $Pf_1$, $Pf_2$, and $Pf_3$, thereby preventing the parasitic capacitance and allowing accurate detection of the force. The guard electrode in this case refers to an electrode that faces a portion where the parasitic capacitance occurs, and to which the same waveform as the drive waveform of the force detection is applied, in order to decrease the parasitic capacitance.

In each force detection period $Pf_1$ and each force detection period $Pf_3$, detection may be performed in a part of regions of the first sensor electrodes COML divided into a plurality of regions, or in all of the regions. In each force detection period $Pf_2$, detection may be performed in a part of regions of the gate lines 23 divided into a plurality of regions, or in all of the regions. The three force detection periods Pf are separately provided as the force detection periods $Pf_1$, $Pf_2$, and $Pf_3$, in one frame period (1F). However, at least one force detection period Pf needs to be provided, and four or more force detection periods Pf may be provided in one frame period (1F). The arrangement of the force detection periods $Pf_1$, $Pf_2$, and $Pf_3$ in the one frame period (1F) can be changed. For example, the force detection periods $Pf_1$, $Pf_2$, and $Pf_3$ may be arranged after all the touch detection periods $Pt_x$.

Figure 21:
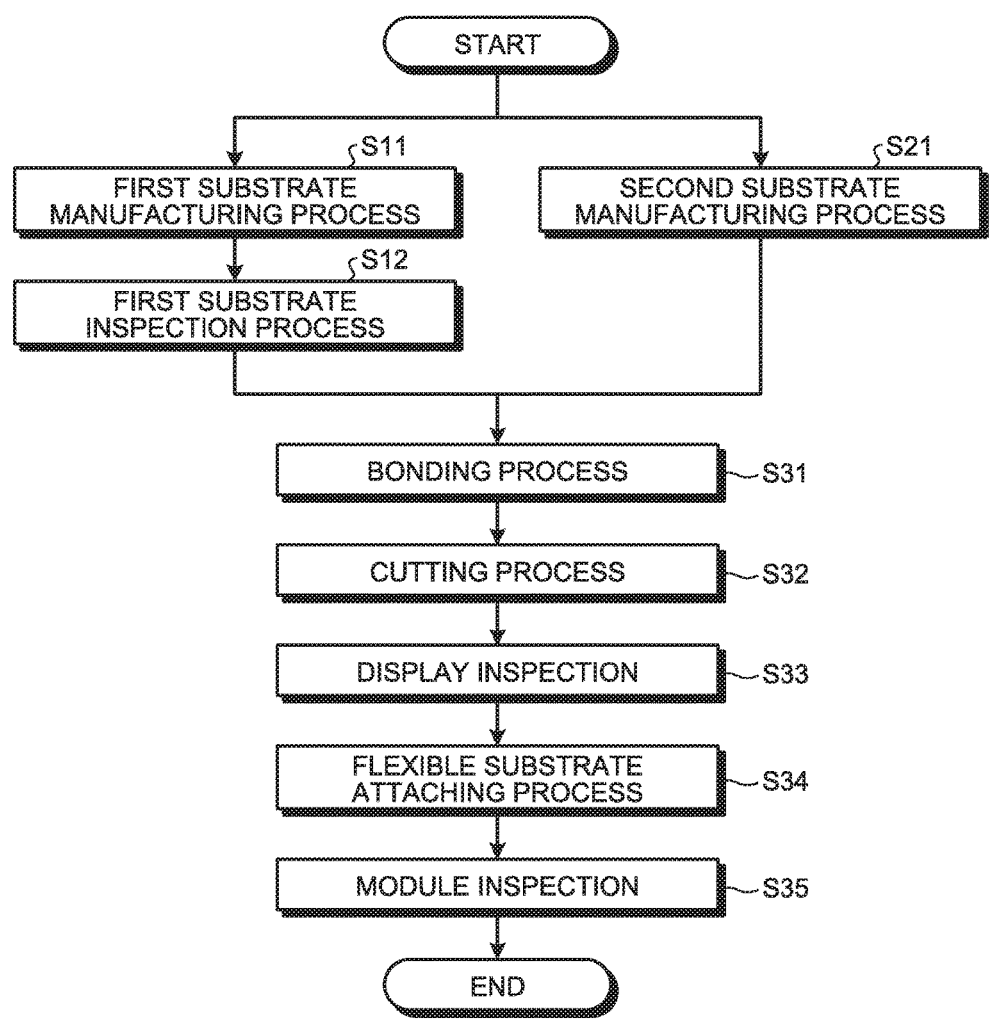
FIG. 21 is a flowchart for describing a method of manufacturing the display apparatus with a touch detection function.
Figure 22:
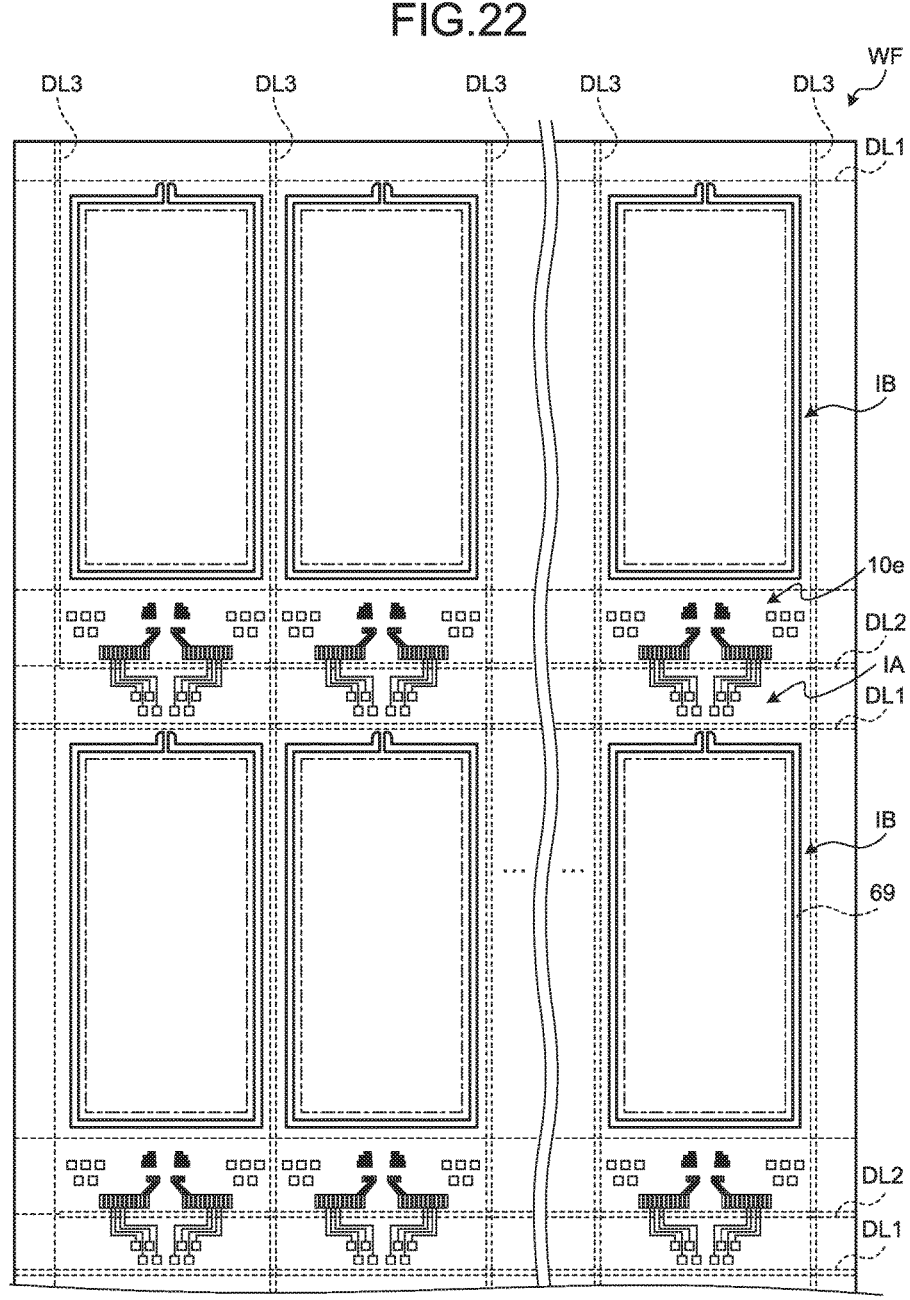
FIG. 22 is an explanatory diagram illustrating the state of a substrate after a bonding process.
Figure 23:
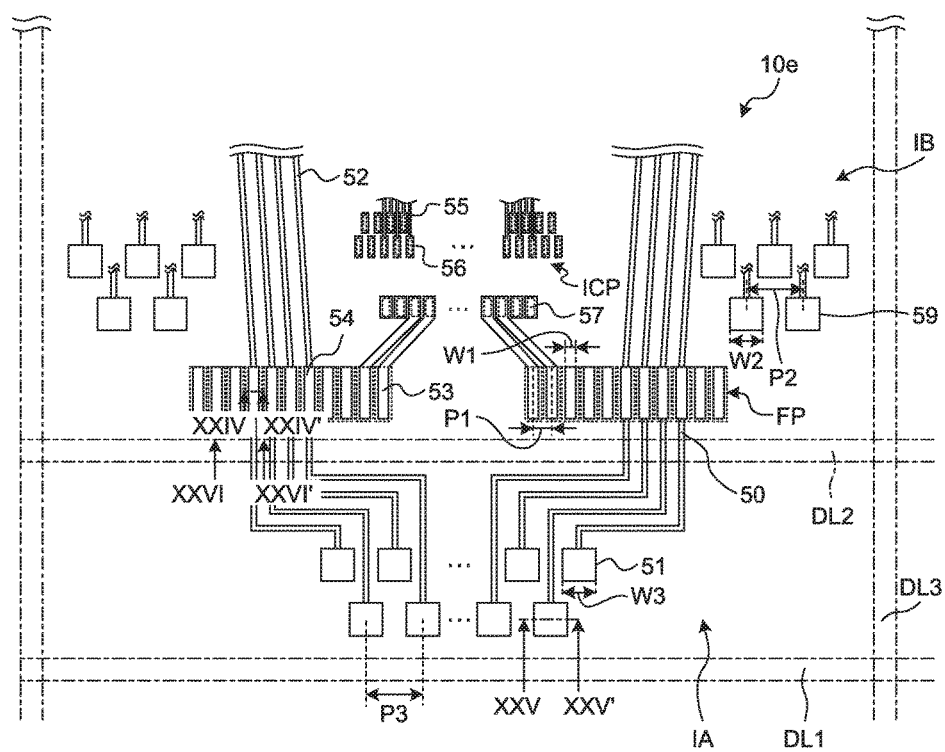
FIG. 23 is an enlarged schematic plan view illustrating a frame region of FIG. 22.
Figure 24:
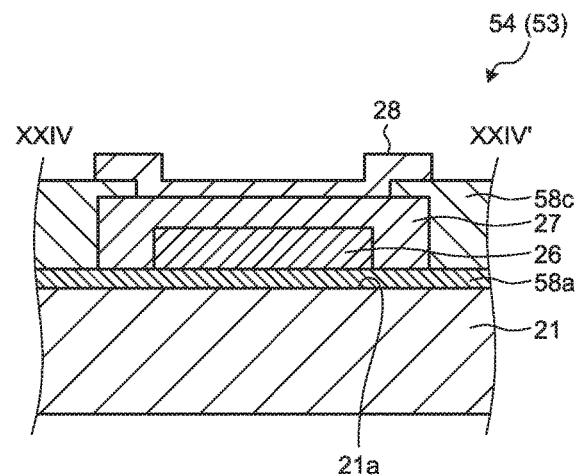
FIG. 24 is a schematic sectional view illustrating an example of a cross section of a pad for IC coupling.
Figure 25:
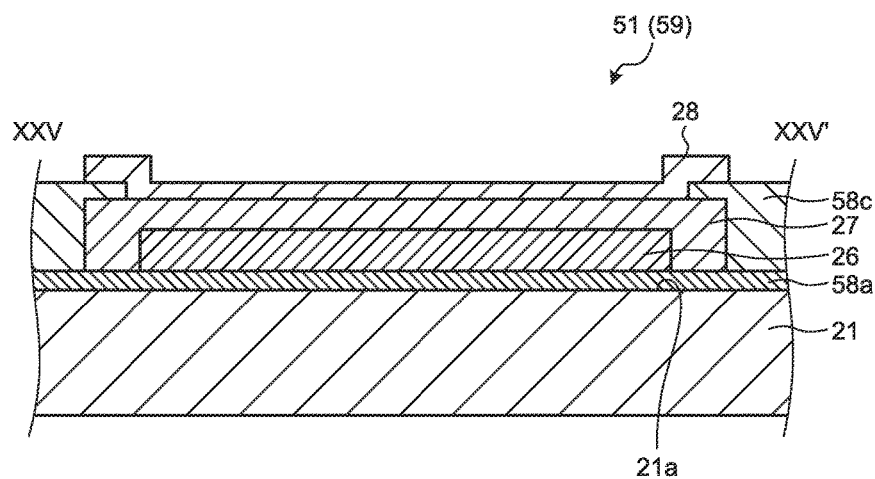
FIG. 25 is a schematic sectional view illustrating an example of a cross section of a pad for sensor inspection and a pad for display inspection.

FIG. 21 is a flowchart for describing a method of manufacturing the display apparatus with a touch detection function. FIG. 22 is an explanatory diagram illustrating the state of a substrate after a bonding process. FIG. 23 is an enlarged schematic plan view illustrating a frame region of FIG. 22. FIG. 24 is a schematic sectional view illustrating an example of a cross section of a pad for IC coupling. FIG. 25 is a schematic sectional view illustrating an example of a cross section of a pad for sensor inspection pad and a pad for display inspection.

As illustrated in FIG. 21, a first substrate manufacturing process (step S11) and a second substrate manufacturing process (step S21) are performed in parallel. First, in the first substrate manufacturing process (step S11), a first mother substrate to become the first substrates 21 is manufactured.

In a first substrate inspection process (step S12) after the first substrate manufacturing process (step S11), inspection of the first sensor electrodes COML or the gate lines 23 is performed in each first substrate 21.

As described above, the second drive signal Vd is supplied to the first sensor electrodes COML or the gate lines 23 (third sensor electrodes), and the second detection signal Vdet2 or the third detection signal Vdet3 need to be detected. Thus, as illustrated in FIG. 23, pads 51 for sensor electrode inspection are provided in addition to the pads 59 for display inspection, and conduction from the pads 51 for sensor electrode inspection to the first sensor electrodes COML (see FIG. 13), or to the gate lines 23 (see FIG. 13) needs to be confirmed.

As illustrated in FIG. 22, on a mother substrate WF that has been subjected to the first substrate manufacturing process (step S11), a plurality of first substrate regions IB and a plurality of end material regions IA are formed. Each end material region IA is arranged between the first substrate regions IB and adjacent to the first substrate regions IB. The first substrate region IB includes all regions to become the display region 10a, and the frame regions 10b, 10c, 10d, and 10e outside the display region 10a.

As illustrated in FIG. 23, pull-out lines 50 are coupled with the pads 51 for sensor electrode inspection, and the pull-out lines 50 are arranged across the first substrate region IB and the end material region IA. In other words, the pull-out lines 50 pass through a dicing line DL2 where the first substrate region IB and the end material region IA are cut and separated, and couples the first substrate region IB and the end material region IA with each other.

As illustrated in FIG. 23, the pad ICP for IC coupling includes a pad 57 for IC coupling for input and a pad 56 for IC coupling for output, and the frame line 55 for display is coupled with the pad 56 for IC coupling. A pad FP for external coupling includes a pad 53 for external coupling to be coupled with the pad 57 for IC coupling, a pad 54 for external coupling for the sensor electrode, and a dummy pad for external coupling. A plurality of frame lines 52 for sensor electrodes is arranged in the frame region 10e. The frame line 52 for a sensor electrode is coupled with the first sensor electrode COML, for example, through a through hole SH and the like. The pad 54 for external coupling is coupled with the frame line 52 for a sensor electrode and the pull-out line 50. In this way, the pull-out line 50 is coupled with the first sensor electrode COML through the pad 54 for external coupling and the frame line 52 for a sensor electrode. Similarly, the pull-out line 50 is coupled with the gate line 23 through the pad 54 for external coupling and the frame line 52 for a sensor electrode.

The pad 51 for sensor electrode inspection is larger than the pad FP for external coupling, and an array pitch P3 of the pads 51 for sensor electrode inspection is larger than an array pitch P1 of the pads FP for external coupling, similarly to an array pitch P2 of the pads 59 for display inspection. The pad FP for external coupling is coupled with the flexible substrate 71 by crimping, for example, using a crimping head with an anisotropic conductive film (AFC) interposed therebetween, which easily establishes ohmic contact. This configuration can narrow the array pitch P1. In contrast, a probe comes in contact with the pad 59 for display inspection, and thus a contact area between the surface of the pad 59 for display inspection and the probe needs to be secured. This requires the array pitch P2 of the pads 59 for display inspection to be larger than the array pitch P1 of the pads FP for external coupling, and a width W2 of the pad 59 for display inspection to be larger than a width W1 of the pad FP for external coupling. Thus, the array pitch P1 of the pads FP for external coupling becomes smaller than the array pitch P2 of the pads 59 for display inspection. The array pitch P2 of the pads 59 for display inspection falls within a range of 0.30 mm to 0.80 mm The width W2 of the pad 59 for display inspection falls within a range of 0.25 mm to 0.70 mm Under the condition described above where the array pitch P1 of the pads FP for external coupling becomes smaller than the array pitch P2 of the pads 59 for display inspection, the array pitch P1 of the pads FP for external coupling preferably falls within a range of 0.02 mm to 0.6 mm, and more preferably, within a range of 0.02 mm to 0.3 mm Under the condition where the width W1 of the pad FP for external coupling becomes smaller than the width W2 of the pad 59 for display inspection, the width W1 of the pad FP for external coupling preferably falls within a range of 0.01 mm to 0.5 mm, and more preferably, within a range of 0.01 mm to 0.25 mm The array pitch P3 of the pad 51 for sensor electrode inspection is preferably the same as the array pitch P2 of the pad 59 for display inspection, and the width W3 of the pad 51 for sensor electrode inspection is the same as the width W2 of the pad 59 for display inspection. This configuration allows the probe for inspecting the pad 51 for sensor electrode inspection to be the same as the probe for inspecting the pad 59 for display inspection. Thus, arranging the pads 51 for sensor electrode inspection in the frame region 10e widens the first substrate region IB. On the other hand, in the first embodiment, arranging the pads 51 for sensor electrode inspection in the end material region IA narrows the first substrate region IB, thereby reducing the size of the display apparatus 1 with a touch detection function.

The cross section illustrated in FIG. 24 is a cross section taken along line XXIV-XXIV' in FIG. 23. The cross section illustrated in FIG. 25 is a cross section taken along line XXV-XXV' in FIG. 23.

As illustrated in FIG. 24, in the pad 54 for external coupling, the insulating layer 58a is formed on the first substrate 21. A metal layer 26 is formed on the insulating layer 58a, and includes the same metal material as that of the gate line 23. Then, a metal layer 27 is formed to cover the metal layer 26. The periphery of the metal layer 27 is flattened by the insulating layer 58c. The metal layer 27 includes the same metal material of that of the source line 25. Subsequently, a light-transmissive conductive layer 28 formed of the same material as that of the first sensor electrode COML is formed in contact with the surface of the metal layer 27. The pad 54 for external coupling is a laminated body in which the metal layer 26, the metal layer 27, and the light-transmissive conductive layer 28 are laminated. The light-transmissive conductive layer 28 is disposed on the uppermost surface of the pad 54 for external coupling. The pad 53 for external coupling and the pad FP for external coupling each have the same structure as that of the external coupling pad 54.

As illustrated in FIG. 25, in the pad 51 for sensor electrode inspection, the insulating layer 58a is formed on the first substrate 21. The metal layer 26 is formed on the insulating layer 58a, and includes the same metal material as that of the gate line 23. Then, the metal layer 27 is formed to cover the metal layer 26. The periphery of the metal layer 27 is flattened by the insulating layer 58c. The metal layer 27 includes the same metal material of that of the source line 25. Subsequently, the light-transmissive conductive layer 28 made of the same material as that of the first sensor electrode COML or that of the pixel electrode 22 is formed in contact with the surface of the metal layer 27. The pad 51 for sensor electrode inspection is a laminated body in which the metal layer 26, the metal layer 27, and the light-transmissive conductive layer 28 are laminated. The light-transmissive conductive layer 28 is disposed on the uppermost surface of the pad 51 for sensor electrode inspection. This configuration allows the pad 51 for sensor electrode inspection to be easily brought in full contact with the probe, and lowers contact resistance to the probe. The pad 59 for display inspection has the same structure as that of the pad 51 for sensor electrode inspection. The metal layer 26 is a layer simultaneously formed with the gate line 23 illustrated in FIG. 19 (the same layer as that of the gate line 23), and the metal layer 27 is a layer simultaneously formed with the source line 25 illustrated in FIG. 19 (the same layer as that of the source line 23).

As described above, the method of inspecting a sensor electrode of the present embodiment includes the first substrate inspection process (step S12), in which the probe is brought in contact with the pad 51 for sensor electrode inspection illustrated in FIG. 23, so that conduction is inspected. When the probe is brought in contact and conduction is not confirmed, abnormality can be determined between the frame line 52 for a sensor electrode and the first sensor electrode COML. The conduction inspection can determine whether there is a short circuit in the first sensor electrodes COML, and can confirm a defect in the patterning of the first sensor electrodes COML. In this way, conduction from the pad 51 for sensor electrode inspection to the first sensor electrode COML or to the gate line 23 is confirmed before the first substrate region IB and the end material region IA are separated from each other by cutting.

In a second substrate manufacturing process (step S21), a second mother substrate to become a plurality of second substrates 31 is manufactured.

In a bonding process (step S31), the first mother substrate manufactured in step S11 and the second mother substrate manufactured in step S21 are bonded together.

In the bonding process (step S31), the above-described liquid crystal layer 6 is also manufactured. As illustrated in FIG. 22, sealing members 69 are formed in the respective first substrate regions IB. Liquid crystals are filled in a region surrounded by the sealing member 69 in the bonding process (step S31).

After the bonding process (step S31), a panel obtained by bonding the first substrate 21 and the second substrate 31 together is manufactured in a cutting process (step S32). For example, the mother substrate WF is cut along dicing lines DL1 and the dicing lines DL2 illustrated in FIG. 22. Subsequently, the mother substrate WF is cut along dicing lines DL3.

Figure 26:
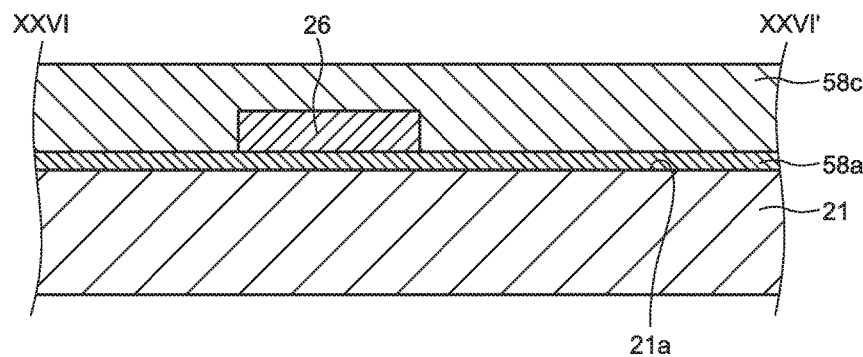
FIG. 26 is a schematic sectional view illustrating an example of a cut surface of a pull-out line.

FIG. 26 is a schematic sectional view illustrating an example of a cut surface of the pull-out line. The cross section illustrated in FIG. 26 is a cross section taken along line XXVI-XXVI' in FIG. 23. As illustrated in FIG. 26, the insulating layer 58a is formed on the first substrate 21. The metal layer 26 is formed on the insulating layer 58a, and is covered with the insulating layer 58c. When the mother substrate WF is cut along the dicing line DL2, the metal layer 26 of the pull-out line 50 is exposed at a cut surface of an end portion of the first substrate 21. The metal layer 26 of the pull-out line 50 is made of the same metal material of that of the gate line 23. Especially when including molybdenum, the metal layer 26 prevents corrosion and the like. The metal layer 26 of the pull-out line 50 is a layer simultaneously formed with the gate line 23 illustrated in FIG. 19 (the same layer as that of the gate line 23).

The width of the metal layer 26 illustrated in FIG. 26 is preferably smaller than the width of the pad 54 for external coupling illustrated in FIG. 24. This configuration shortens the length of the outer periphery of the metal layer 26 bordered by the insulating layer 58a and the insulating layer 58c, thereby lowering a possibility of intrusion of water between the metal layer 26 and the insulating layer 58a, and between the metal layer 26 and the insulating layer 58c.

Figure 27:
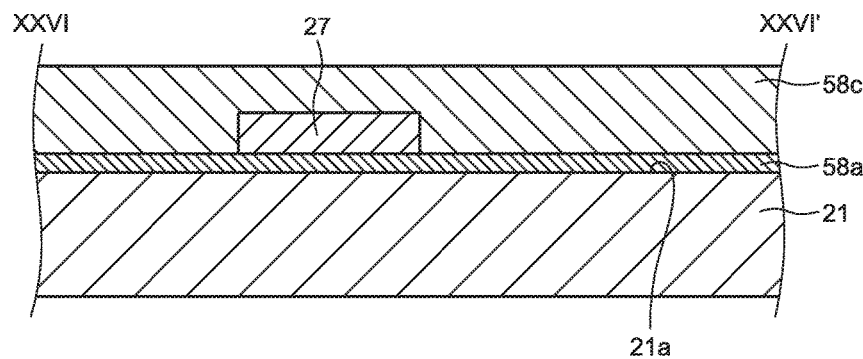
FIG. 27 is a schematic sectional view illustrating another example of a cut surface of the pull-out line.

FIG. 27 is a schematic sectional view illustrating another example of a cut surface of the pull-out line. The cross section illustrated in FIG. 27 is another example of a schematic cross section taken along line XXVI-XXVI' in FIG. 23. As illustrated in FIG. 27, the metal layer 27 of the pull-out line 50 may be exposed at a cut surface of an end portion of the first substrate 21. The metal layer 27 of the pull-out line 50 includes the same metal material of that of the source line 25. In this way, the metal layer 27 of the pull-out line 50 is a layer simultaneously formed with the source line 25 illustrated in FIG. 19 (the same layer as that of the source line 25).

In a display inspection process (step S33), the probe is brought in contact with the display inspection pad 59, and conduction is inspected. In a flexible substrate attaching process (step S34), the flexible substrates 71 and 72 are attached to the panel described above, and thus a module illustrated in FIG. 14 is manufactured.

Subsequently, in a module inspection process (step S35), the display operation of the display apparatus 1 with a touch detection function, the input operation or the force detection operation of the display apparatus 1 with a touch detection function are inspected using the flexible substrates 71 and 72, the first control IC 19, and the second control IC 18.

As described above, the array substrate 2 of the display apparatus 1 with a touch detection function includes the first substrate 21, the first sensor electrodes COML, and the pull-out lines 50. The first sensor electrodes COML are arranged on the first substrate 21, and detect change of the capacitance. The pull-out lines 50 can be electrically coupled with the respective first sensor electrodes COML, and are pulled out to an end portion of the first substrate 21. This configuration allows the first substrate 21 to be inspected before the module inspection process (step S35), thereby allowing manufacturing of the display apparatus 1 with a touch detection function using the first substrate 21 of high quality. The frame region 10e has no pad 51 for sensor electrode inspection, thereby allowing the frame region 10e to be small, and reducing the size of the array substrate 2.

Second Embodiment

Figure 28:
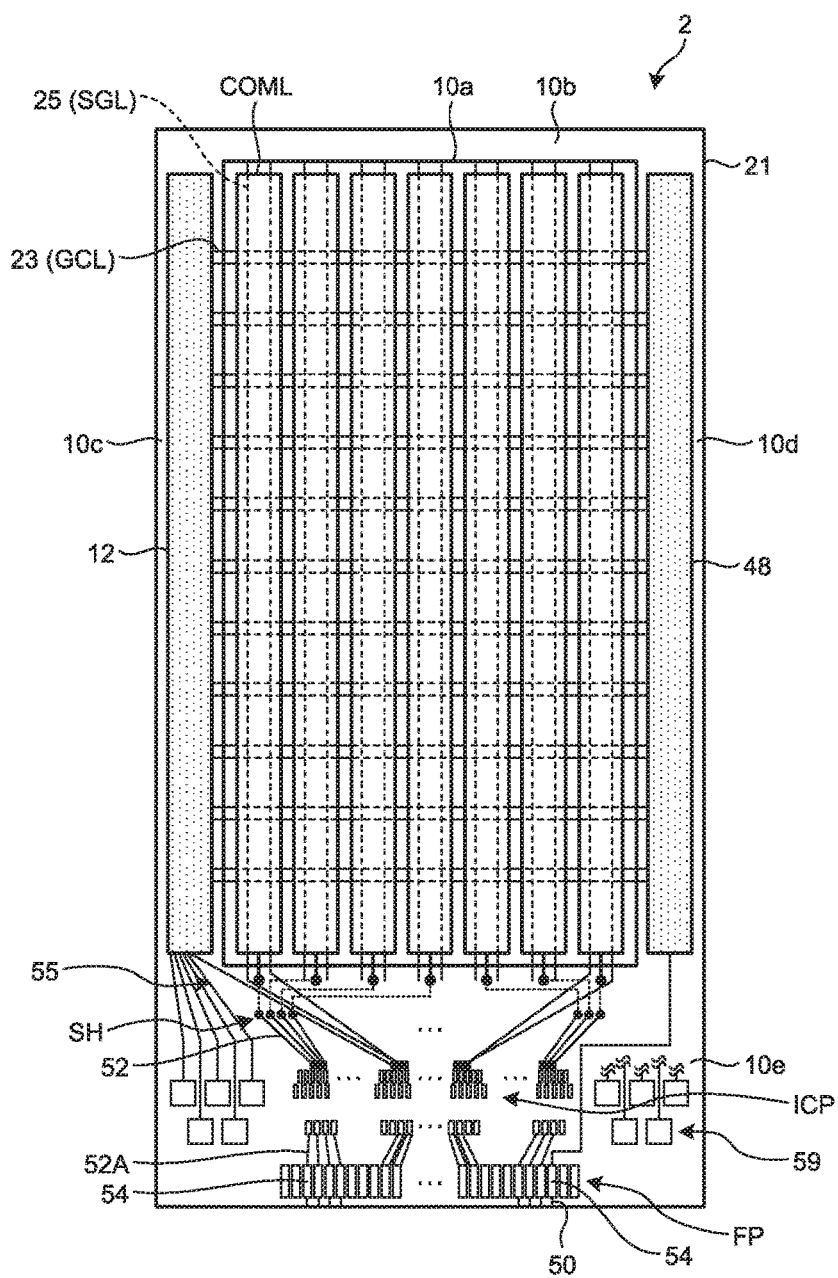
FIG. 28 is a plan view schematically illustrating a first substrate of a display apparatus with a touch detection function according to a second embodiment.
Figure 29:
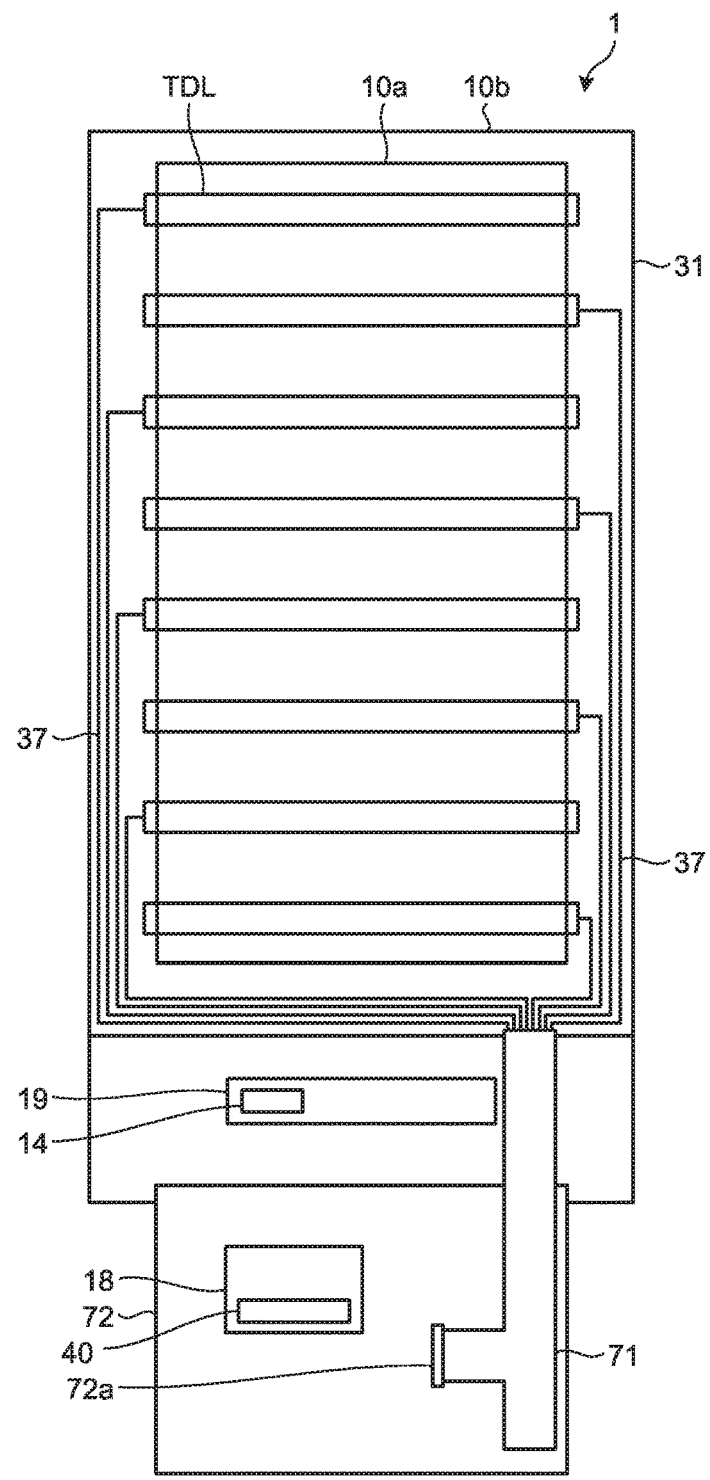
FIG. 29 is a plan view schematically illustrating a second substrate of the display apparatus with a touch detection function according to the second embodiment.

FIG. 28 is a plan view schematically illustrating a first substrate of a display apparatus with a touch detection function according to a second embodiment. FIG. 29 is a plan view schematically illustrating a second substrate of the display apparatus with a touch detection function according to the second embodiment.

A first control IC 19 of the second embodiment includes a first sensor driver 14. A detector 40 of a second control IC 18 includes a second drive signal generator 15. A plurality of frame lines 52 for sensor electrodes is arranged in a frame region 10e. The frame line 52 for a sensor electrode extends from an input side of a pad ICP for IC coupling, and is coupled with a first sensor electrode COML through a through hole SH or the like. A frame line 52A for a sensor electrode couples an input side terminal of the pad ICP for IC coupling with a pad 54 for external coupling. The pad 54 for external coupling is further coupled with a pull-out line 50. In this way, the pull-out line 50 is electrically coupled with the first sensor electrode COML through the pad 54 for external coupling, the frame line 52A for a sensor electrode, an internal circuit of the first sensor driver 14, and the frame line 52 for a sensor electrode.

Third Embodiment

Figure 30:
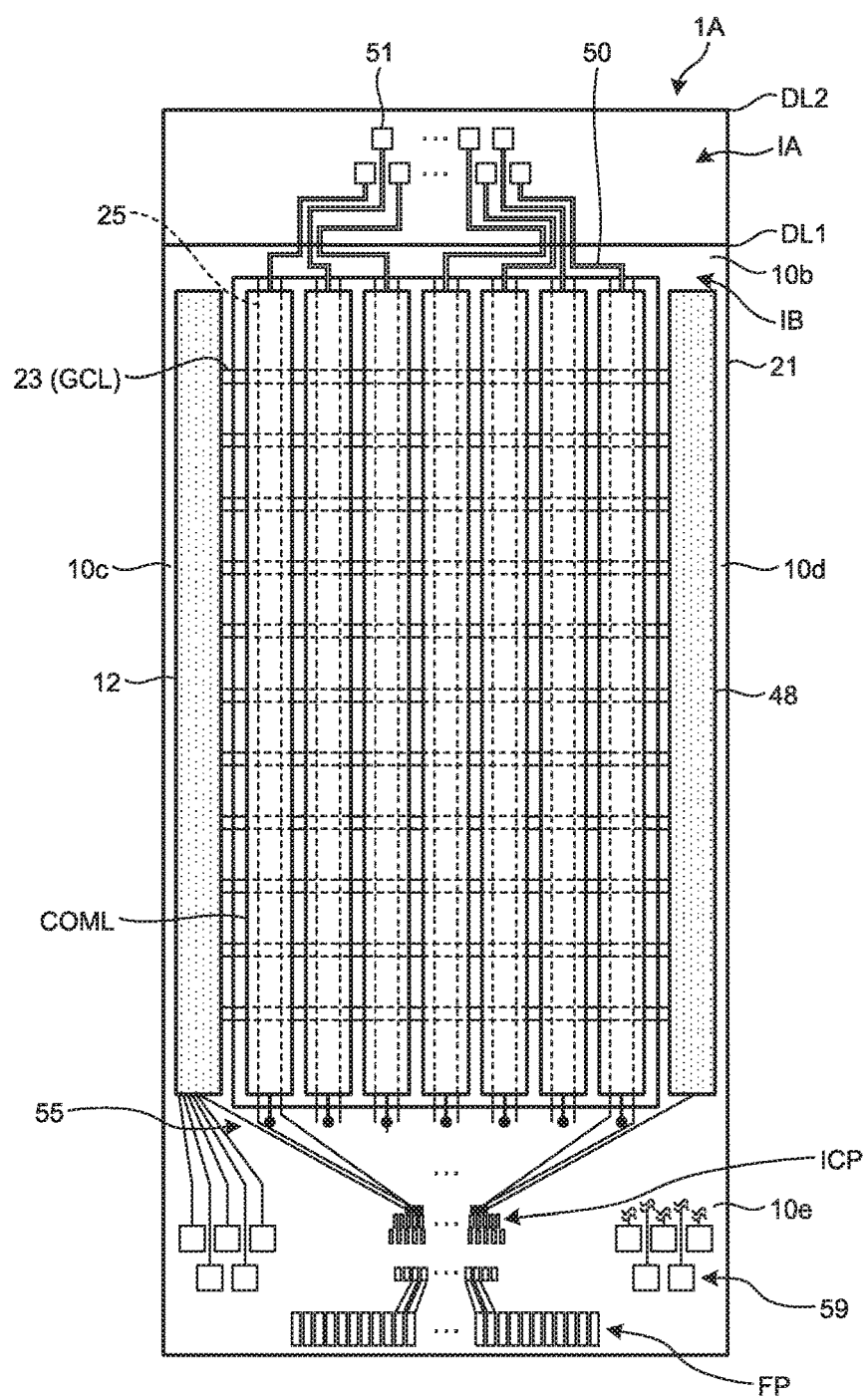
FIG. 30 is a plan view schematically illustrating a first substrate of a display apparatus with a touch detection function according to a third embodiment.

FIG. 30 is a plan view schematically illustrating a first substrate of a display apparatus with a touch detection function according to a third embodiment. As illustrated in FIG. 30, pull-out lines 50 are directly coupled with respective first sensor electrodes COML, and are arranged across a boundary of a first substrate region IB and an end material region IA. In other words, the pull-out lines 50 pass through a dicing line DL1 where the first substrate region IB and the end material region IA are separated from each other by cutting, and couple the first substrate region IB and the end material region IA with each other. When the first substrate region IB and the end material region IA are separated from each other by cutting, the pull-out lines 50 included in an array substrate of a display apparatus 1A with a touch detection function are electrically coupled with the respective first sensor electrodes COML, and pulled out to an end portion of a first substrate 21. Also in the third embodiment, a frame region 10e has no pad 51 for sensor electrode inspection, which allows the frame region 10e to be small and thus reduces the size of the first substrate 21.

Preferred embodiments of the present invention have been described above. However, the present invention is not limited to these embodiments. The content disclosed in the embodiments is merely an example, and various modifications can be made without departing from the gist of the present invention. The appropriate modifications made without departing from the gist of the present invention naturally belong to the technical scope of the present invention.

The example has been described above in which the second sensor electrode TDL performs the mutual capacitance touch detection, for example. However, the second sensor electrode TDL may perform self-capacitance touch detection. The mutual capacitive touch detection and the self-capacitive touch detection may be combined with each other.

The example has been described above in which the first substrate regions IB are cut and separated from the mother substrate WF. However, the mother substrate WF may include one first substrate region IB and one end material region IA.

The present invention can naturally provide other advantageous effects that are provided by the aspects described in the embodiments above and are clearly defined by the description in the present specification or appropriately conceivable by those skilled in the art.

What is claimed is:

1. An array substrate comprising:
   a substrate;
   a sensor electrode disposed on the substrate, and configured to detect change of capacitance; and
   a pull-out line capable of being electrically coupled with the sensor electrode, and pulled out to an end portion of the substrate,
   a plurality of pads for external coupling arranged in a frame region of the substrate; and
   a frame line configured to couple the sensor electrode and one of the pads for external coupling with each other, wherein
   the pull-out line is coupled with the sensor electrode through the frame line and one of the external coupling pads, and
   an array pitch of the pads for external coupling falls within a range of 0.02 mm to 0.6 mm.

2. The array substrate according to claim 1, wherein the pull-out line includes a metal layer.

3. The array substrate according to claim 2, further comprising:
   a gate line; and
   a source line, wherein
   the metal layer includes a metal material identical to a metal material included in the gate line or the source line.

4. The array substrate according to claim 2, further comprising:
   a gate line; and
   a source line, wherein
   the metal layer is a layer identical to a layer of the gate line or the source line.

5. The array substrate according to claim 2, wherein the metal layer of the pull-out line is exposed at a cut surface of the end portion of the substrate.

6. The array substrate according to claim 1, further comprising:
   a pixel electrode;
   a gate line;
   a source line; and
   a plurality of pads for display inspection configured to inspect one of the pixel electrode, the gate line, and the source line, wherein
   an array pitch of the pads for external coupling is smaller than an array pitch of the pads for display inspection.

7. The array substrate according to claim 1, further comprising a light-transmissive conductive layer on an uppermost surface of each of the pads for external coupling.

8. A display apparatus in which the array substrate according to claim 1 and a counter substrate are bonded together.

9. An array substrate comprising:
   a substrate;
   a sensor electrode disposed on the substrate, and configured to detect change of capacitance;
   a pull-out line capable of being electrically coupled with the sensor electrode, and pulled out to an end portion of the substrate;
   a plurality of pads for external coupling arranged in a frame region of the substrate; and
   a frame line configured to couple the sensor electrode and one of the pads for external coupling with each other, wherein
   the pull-out line is coupled with the sensor electrode through the frame line and one of the external coupling pads, and
   a width of each of the pad for external coupling falls within a range of 0.01 mm to 0.50 mm.

10. The array substrate according to claim 9, wherein the pull-out line includes a metal layer.

11. The array substrate according to claim 10, further comprising:
    a gate line; and
    a source line, wherein
    the metal layer includes a metal material identical to a metal material included in the gate line or the source line.

12. The array substrate according to claim 10, further comprising:
    a gate line; and
    a source line, wherein
    the metal layer is a layer identical to a layer of the gate line or the source line.

13. The array substrate according to claim 10, wherein the metal layer of the pull-out line is exposed at a cut surface of the end portion of the substrate.

14. The array substrate according to claim 9, further comprising: a pixel electrode;
    a gate line;
    a source line; and
    a plurality of pads for display inspection configured to inspect one of the pixel electrode, the gate line, and the source line, wherein
    an array pitch of the pads for external coupling is smaller than an array pitch of the pads for display inspection.

15. The array substrate according to claim 9, further comprising a light-transmissive conductive layer on an uppermost surface of each of the pads for external coupling.

16. A display apparatus in which the array substrate according to claim 9 and a counter substrate are bonded together.

* * * * *